United States Patent
Barefoot et al.

(10) Patent No.: US 11,524,746 B2
(45) Date of Patent: Dec. 13, 2022

(54) ADJUSTABLE CHAIN GUIDE SYSTEM

(71) Applicant: Eko Sport, Inc., Grand Junction, CO (US)

(72) Inventors: Darek C. Barefoot, Grand Junction, CO (US); Scott Winans, Grand Junction, CO (US); Cole Hanson, Grand Junction, CO (US)

(73) Assignee: Eko Sport, Inc., Grand Junction, CO (US)

( * ) Notice: Subject to any disclaimer, the term of this patent is extended or adjusted under 35 U.S.C. 154(b) by 275 days.

(21) Appl. No.: 16/842,109

(22) Filed: Apr. 7, 2020

(65) Prior Publication Data

US 2020/0324858 A1 Oct. 15, 2020

Related U.S. Application Data

(60) Provisional application No. 62/831,934, filed on Apr. 10, 2019.

(51) Int. Cl.
*B62M 9/00* (2006.01)
*B62M 1/36* (2013.01)

(52) U.S. Cl.
CPC ............. *B62M 9/00* (2013.01); *B62M 1/36* (2013.01); *B62M 2009/007* (2013.01)

(58) Field of Classification Search
CPC ..... B62M 9/00; B62M 1/36; B62M 2009/007
See application file for complete search history.

(56) References Cited

U.S. PATENT DOCUMENTS

| 4,573,950 | A  | 3/1986  | Nagano         |
| 4,832,667 | A  | 5/1989  | Wren           |
| 5,002,520 | A  | 3/1991  | Greenlaw       |
| 5,460,576 | A  | 10/1995 | Barnett        |
| 6,354,973 | B1 | 3/2002  | Barnett        |
| 7,059,983 | B2 | 6/2006  | Heim           |
| 8,235,849 | B2 | 8/2012  | Cranston et al.|
| RE44,379  | E  | 7/2013  | Rogers         |
| 8,491,429 | B2 | 7/2013  | Cranston et al.|
| 8,534,693 | B2 | 9/2013  | Sloan et al.   |
| 8,961,342 | B2 | 2/2015  | Emura et al.   |
| 8,968,129 | B2 | 3/2015  | Emura et al.   |
| 8,991,846 | B2 | 3/2015  | Twers          |
| RE45,508  | E  | 5/2015  | Rogers         |
| 9,249,867 | B2 | 2/2016  | Graziosi et al.|

(Continued)

OTHER PUBLICATIONS

Chain Guide—ISCG05, [online], Retrieved from https://www.oneupcomponents.com/, OneUp Components, United States of America.
Chain Keeper, [online], Retrieved from https://www.paulcomp.com/, [2019], Paul Component Engineering, United States of America.
FSA Grid Chain Guide, [online], Retrieved from https://www.fullspeedahead.com/, [2019], Apr. 7, 2017, Full Speed Ahead, United States of America.

(Continued)

*Primary Examiner* — Jacob D Knutson
*Assistant Examiner* — Abigail R Hymel
(74) *Attorney, Agent, or Firm* — Jason H. Foster; Kremblas & Foster

(57) ABSTRACT

An assembly for minimizing the disengagement of a chain from a chain ring is disclosed. The assembly includes a bracket and a chain guide assembly. The chain guide assembly includes a chain guide, a first lock and a second lock. The first lock and the second lock are capable of being actuated separately to lock the chain guide into a position in each of a first and second orientation relative to the bracket.

20 Claims, 17 Drawing Sheets

(56) References Cited

U.S. PATENT DOCUMENTS

| | | |
|---|---|---|
| 9,327,786 B2 | 5/2016 | Cranston et al. |
| 9,896,157 B2 | 2/2018 | Emura et al. |
| 10,053,188 B2 | 8/2018 | Staples |
| 2002/0160869 A1 | 10/2002 | Barnett |
| 2003/0060316 A1 | 3/2003 | Jiang |
| 2004/0009835 A1 | 1/2004 | Heim |
| 2006/0199690 A1 | 9/2006 | Gardner et al. |
| 2007/0265121 A1 | 11/2007 | Gross |
| 2009/0062049 A1 | 3/2009 | Cranston et al. |
| 2009/0220319 A1 | 9/2009 | Weagle |
| 2012/0142469 A1 | 6/2012 | Barefoot et al. |
| 2012/0248730 A1 | 10/2012 | Sloan et al. |
| 2013/0053196 A1 | 2/2013 | Emura et al. |
| 2017/0045121 A1 | 2/2017 | Staples |
| 2018/0022418 A1* | 1/2018 | Pfeiffer ................ B62M 9/136 474/140 |
| 2018/0319459 A1 | 11/2018 | Staples |

OTHER PUBLICATIONS

Cheap Chain Keeper, [online], Retrieved from https://getfireshot.com/, [2018], Bike Forums, MH Sub I, LLC dba Internet Brands, 2010, United States of America.

Bikeblogger, Paul Chain Keeper Catcher Guide Installation, [online], Retrieved from https://www.youtube.com/, Oct. 3, 2015, United States of America.

Weagle NPL_20131017 9, photo.

Weagle NPL_20131017 10, photo.

Weagle NPL_20131017 16, magazine, p. 138.

Weagle NPL_20131017 19, Chainguide, Race Face Performance Products, 2005.

Weagle NPL_20131017 21, Universal Chainguide System, brochure, Mountain Cycle Simply the Best, United States of America.

Weagle NPL_20131017 22, Universal Chainguide System, brochure, Mountain Cycle Simply the Best, United States of America.

Weagle NPL_20131017 23, Universal Chainguide System, brochure, Figures 1-8, Mountain Cycle Simply the Best, United States of America.

* cited by examiner

SECTION B-B

SECTION C-C

SECTION D-D

ADJUSTABLE CHAIN GUIDE SYSTEM

BACKGROUND OF THE INVENTION

The present disclosure relates to a chain guide for a bicycle. More specifically, the present design relates to a chain guide for use adjacent a front gear of a bicycle, where the chain guide is adjustable in multiple orientations, one of which is adjustable separately from the others, but along the same axis.

Bicycles come in many different shapes and sizes. Riders change their bicycles in a variety of ways so that the bicycles perform in the manner a rider desires. In some cases, the rider may select a particular frame size that fits them in a particular manner. They may select a particular handlebar or tire style, depending on whether they are doing road racing or off-road riding. They may select a particular suspension style, depending on the number and type of obstacles they may encounter.

In addition to these considerations, riders may wish to vary the chain rings that they use with their bicycles in order to better tune the torque they will require to properly ride in a particular location. A rider may want to select from a variety of chain rings and change them depending on what type of riding they plan to do. However, when a chain ring size is changed, that change may affect other features of the bicycle. In addition, a rider may want to minimize expense by using the same accessory equipment on different bicycles, including bicycles with different overall styles.

In some riding situations, it may be desirable to use a chain guide to minimize the risk of the chain becoming detached from the chain ring. It is conventional to use a chain guide in the area where the bicycle chain comes into contact with a front chain ring or chain ring set and also in the area where the bicycle chain moves away from contact with the front ring or ring set. It is also conventional to secure the chain guide or guides to a bracket or plate that is attached to the bicycle frame adjacent the front chain ring. An example of such devices may be found in U.S. Pat. No. 8,235,849.

However, it is common for a rider to change the chain rings used on a particular bicycle and to use different bicycle frames for riding. Different chain rings incorporated on different bicycle frames will cause the chain to enter and leave the front chain ring set at a variety of angles. The chain guide may be helpful in guiding the chain into proper engagement with the front chain ring and to exit the chain ring at an appropriate angle before returning to the rear chain ring set. While it is possible to design a variety of chain guides that are secured in a corresponding variety of orientations to try to accommodate the large number of possible configurations that a rider may select, it may also be desirable to design a chain guide that can make adjustments in a variety of orientations so that a rider can use the chain guide on a large variety of frames and chain ring sets.

Further, it may be desirable to allow a user to set the chain guide in one orientation and lock it in place, then set an orientation in a different direction and lock it in place independently of locking the guide in place for the first orientation. A structure incorporating this flexibility may allow a rider to more accurately evaluate how to best adjust the guide without requiring the rider to make too many mental calculations simultaneously.

Accordingly, in many embodiments, it may be desirable to incorporate a structure into the chain guide assembly that allows the rider to adjust the guide in a variety of orientations. It may be desirable in some embodiments for a rider to be able to adjust a guide in a first orientation, such as generally or substantially vertically, and then lock the guide into the particular first orientation location. Then, the rider may be able to adjust the guide in a second, third or fourth orientation, such as fore-aft, laterally, or rotationally. It may be desirable for the rider to be able to make these adjustments together or independently.

BRIEF SUMMARY OF THE INVENTION

The present invention is directed to an assembly for minimizing the disengagement of a chain from a chain ring.

In one embodiment, the assembly may include a bracket and a chain guide assembly. The bracket may be configured to be attached to a bicycle frame adjacent a chain ring. The bracket may define a first slot having a first orientation.

The chain guide assembly may be removably attached to the bracket and may include a chain guide, a first lock, a second lock, and a guide. The first lock may define a first axis and may be capable of releasably mounting the chain guide in any position along a length of the first slot. The second lock may be capable of releasably mounting the chain guide in at least a second orientation. The guide may be configured to retain the chain guide in at least the second orientation when the first lock is in an unlocked position. The first orientation may be different from the second orientation. The chain guide may be free to move in at least the second orientation along the first axis with respect to the bracket and the first lock when the first lock is in a locked position.

The chain guide may define a first channel. A sleeve may be positioned at least partially within the first channel. The bracket may include a groove. The guide may include a finger extending from a portion of the chain guide assembly that is capable of interfitting with the groove on the bracket.

The first lock may include a first bolt that may be positioned at least partially within the first channel. The first lock may further include a nut that is capable of mating with the first bolt.

The sleeve may have a first diameter. The first bolt may have a head that may have a second diameter. The second diameter may be greater than the first diameter. The first channel may have a third diameter. The second diameter may be greater than the third diameter.

The chain guide may define a second channel. The second lock may be at least partially positioned within the second channel. A portion of the second lock may be configured to engage a portion of the sleeve.

The first orientation may be a substantially vertical orientation. The second orientation may be a substantially lateral orientation. The second orientation may be a substantially rotational orientation.

The chain guide may be free to move in at least a second orientation and a third orientation with respect to the bracket and the first lock along the first axis when the first lock is in a locked position. The second lock may be capable of releasably mounting the chain guide in the second orientation and the third orientation. The third orientation may be different from the first orientation and the second orientation. The first orientation may be a substantially vertical orientation. The second orientation may be a substantially lateral orientation. The third orientation may be a substantially rotational orientation. The chain guide may be free to move in a fourth orientation different from any of the first orientation, the second orientation, and the third orientation.

The chain guide may include a first chain guide portion and a second chain guide portion. The first chain guide portion and the second chain guide portion may be configured to rotate relative to one another. Rotation of the first chain guide portion and the second chain guide portion relative to one another may engage the second lock.

In another embodiment, the assembly for minimizing the disengagement of a chain from a chain ring may include a bracket, a chain guide assembly, a first lock and a second lock. The bracket may be configured to be attached to a bicycle frame adjacent a chain ring. The chain guide may be removably attached to the bracket and may include a chain guide and a first connector. The chain guide may define a first channel. The first connector may have an axis and may be configured to be positioned at least partially within the first channel. The first lock may be configured to releasably lock the chain guide assembly in at least a first orientation relative to the bracket. The second lock may be configured to releasably lock the chain guide assembly in at least a second orientation relative to the bracket. The first lock and the second lock may be configured to independently orient the chain guide relative to the bracket. The unlocking of only one of the locks independently may allow movement of the chain guide in at least one orientation without affecting the orientation of the chain guide in the other orientation. Movement of the chain guide relative to the bracket in each orientation may be defined by the axis of the first connector.

The first channel may be substantially perpendicular to a direction of movement along the first orientation. A sleeve may be positioned at least partially within the first channel. The bracket may include a groove and the guide may include a finger. The finger may extend from a portion of the chain guide assembly and may be capable of interfitting with the groove on the bracket.

The first connector may include a first bolt positioned at least partially within the first channel. The first lock may further include a nut that is capable of mating with the first bolt.

The sleeve may have a first diameter. The first bolt may have a head that has a second diameter. The second diameter may be greater than the first diameter. The first channel may have a third diameter. The second diameter may be greater than the third diameter.

The chain guide may define a second channel. The second lock may be at least partially positioned within the second channel. The second lock may be configured to engage a portion of the sleeve.

The first orientation may be a substantially vertical orientation. The second orientation may be a substantially lateral orientation. The second orientation may be a substantially rotational orientation.

The chain guide may be free to move in at least a second orientation and a third orientation with respect to the bracket and the first lock along the first axis when the first lock is in the locked position. The second lock may be capable of releasably mounting the chain guide in the second orientation and the third orientation. The third orientation may be different from the first orientation and the second orientation. The first orientation may be a substantially vertical orientation. The second orientation may be a substantially lateral orientation. The third orientation may be a substantially rotational orientation. The chain guide may be free to move in a fourth orientation different from any of the first orientation, the second orientation and the third orientation.

The chain guide may include a first chain guide portion and a second chain guide portion. The first chain guide portion and the second chain guide portion may be configured to rotate relative to one another. Rotation of the first chain guide portion and the second chain guide portion relative to one another may engage the second lock.

Figure 1:
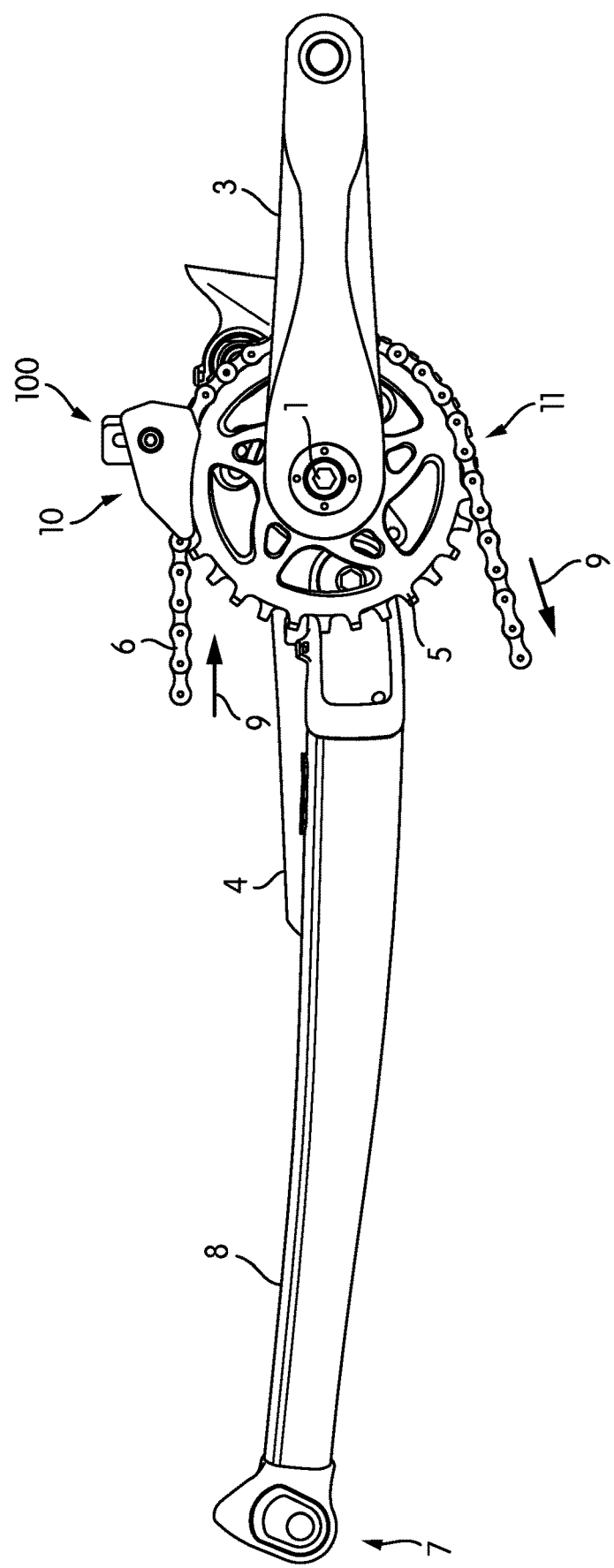
FIG. 1 is a side view of the assembly according to the disclosure, showing the relevant position of the assembly on a bicycle frame.

In describing the preferred embodiment of the invention which is illustrated in the drawings, specific terminology will be resorted to for the sake of clarity. However, it is not intended that the invention be limited to the specific term so selected and it is to be understood that each specific term includes all technical equivalents which operate in a similar manner to accomplish a similar purpose. For example, the word connected or terms similar thereto are often used. They are not limited to direct connection, but include connection through other elements where such connection is recognized as being equivalent by those skilled in the art.

DETAILED DESCRIPTION OF THE INVENTION

In this detailed description, various terms relating to direction may be used. The elements discussed herein relate to a bicycle. Because, in its operable position, a bicycle is oriented generally vertically, i.e., perpendicular to the ground, the direction terms refer to the position of an element relative to gravity when the bicycle is in its operable position. Accordingly, for example, the term "downwardly" refers to the direction towards the ground when the bicycle is in its operable position, and the term "forwardly" relates to a direction towards a front wheel of the bicycle when it is in its operable position. Further, the terms "inboard" and "outboard" may be used. The term "inboard" describes a position between one item and a vertical plane substantially bisecting the bicycle. The term "outboard" describes a position of an object further from the vertical centerplane of the bicycle. In addition, the terms "bicycle" and "bike" are used herein interchangeably. A person having ordinary skill in the art will understand that if something is referred to as one, it can refer to the other.

The present device relates to an assembly for minimizing the risk of disengagement of a chain from a chain ring. The illustrations herein only partially show the bicycle structure. However, an ordinary designer will fully understand how the structures described herein may be incorporated into a bicycle.

Figure 2:
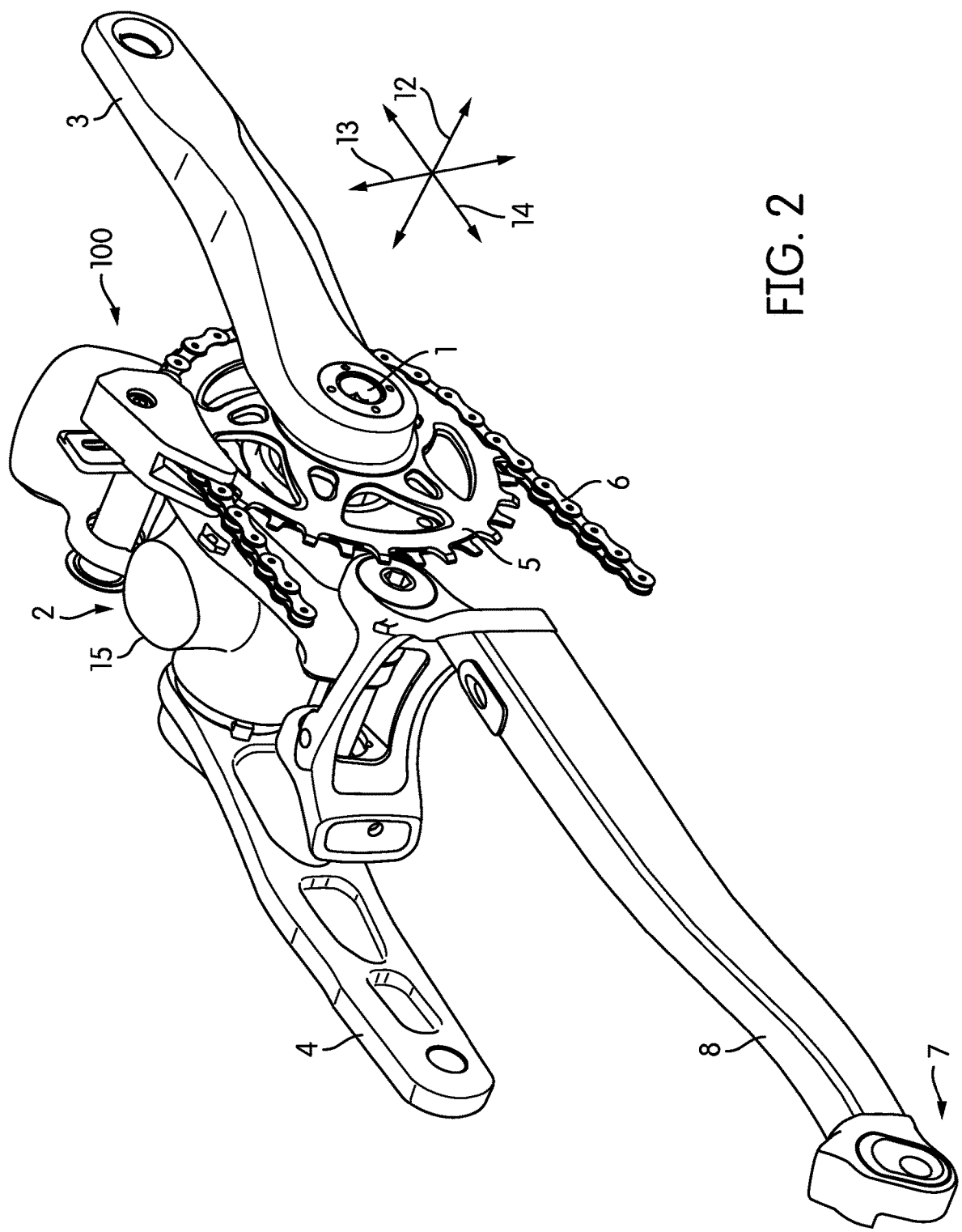
FIG. 2 is a perspective view of the assembly as shown in FIG. 1.
Figure 4:
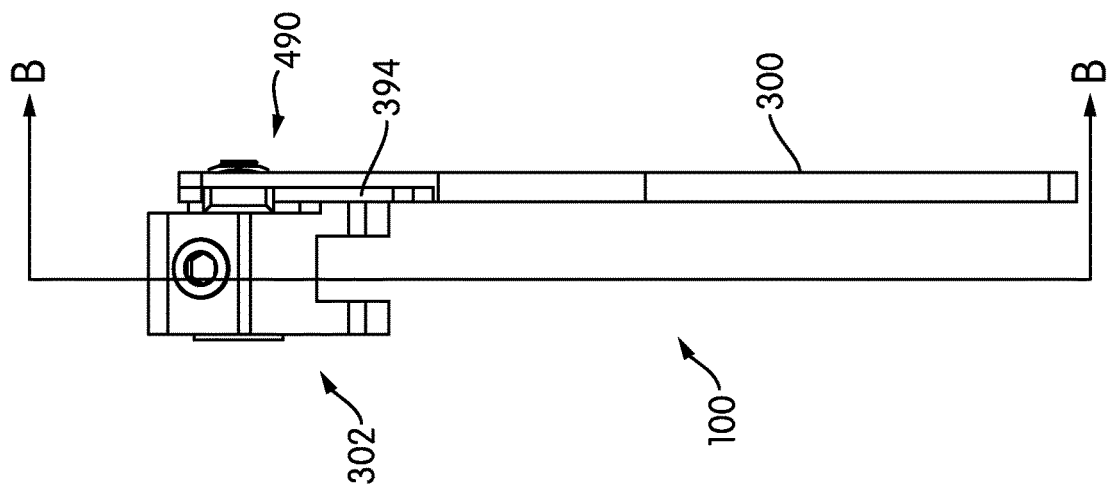
FIG. 4 is a front view of the assembly of FIG. 3.
Figure 3:
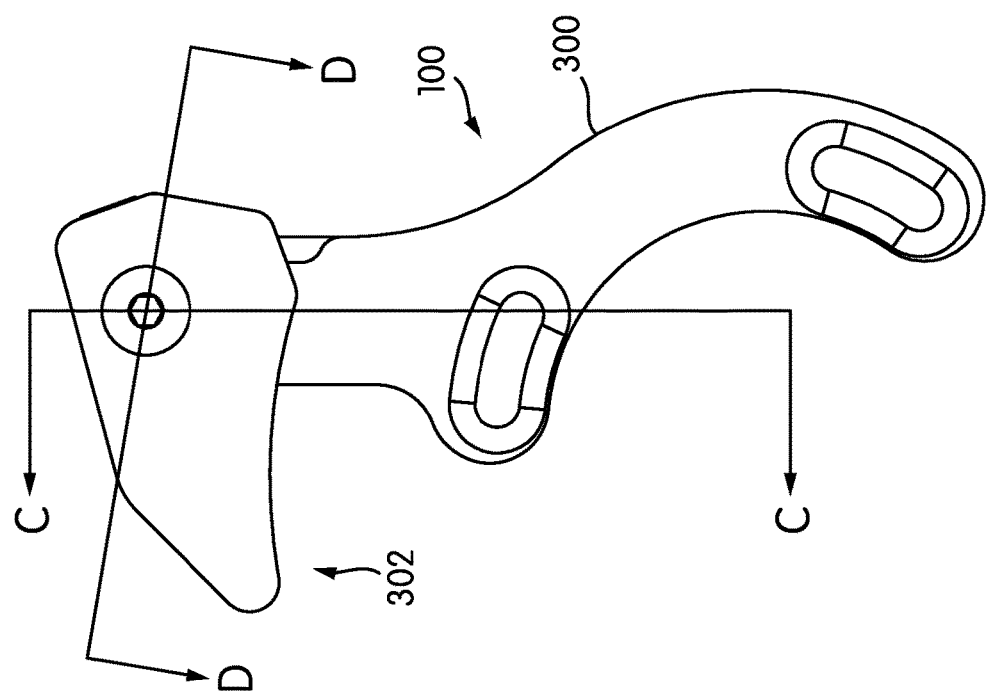
FIG. 3 is a side view of a first embodiment of the assembly.

Turning to FIGS. 1 and 2, when a rider rides a bicycle, the rider presses their feet in a rotational manner on pedals (not shown) attached to a crank shaft 1. The crank shaft extends through a bottom bracket 2 of a bicycle frame 15 and maintains the pedals and the arms 3, 4 attached between the crank shaft 1 and the pedals in an opposite orientation, where they are around 180 degrees apart, as shown. One or more chain rings 5 may be mounted on or adjacent the crank shaft 1. A chain 6 may engage the chain ring 5 and also engages additional, rear chain rings or the cassette (not shown), which are conventionally mounted at a location at the rear end 7 of an arm 8. When the rider uses the pedals and thereby rotates the chain ring 5, the chain 6 may move into and out of engagement with the chain ring 5 and a gear on the cassette. When the bicycle is in use, in typical circumstances, the rider will move the pedals and arms 3,4 in a clockwise direction, and the chain 6 moves in the direction of the arrows 9, although many bicycles allow a rider to pedal in a counterclockwise direction. In most conventional bicycles for adults, a conventional ratchet system (not shown) may be incorporated into the bicycle to disengage the drive force of the drive chain 6 from the rear shaft and wheel (not shown) whenever the pedals are moved in a direction other than clockwise, for example, when coasting. A rider may use a variety of different bicycles and may install a variety of sizes of chain rings 5 in the location shown and in the cassette at the rear location 7. Indeed, riders may select a single front ring 5 or a series of front rings 5 installed adjacent one another in a conventional manner and may select between any number of gears that are installed in the cassette in the rear area 7. Many riders may select two front gears and five rear gears (a "ten speed"), three front gears and seven rear gears (a "twenty-one speed"), or another combination. The choice of the number and size of each ring can be individually selected by the rider to support the type of riding the rider wishes to do and the amount of torque the rider is interested in using to ride. Because of this variability in the number and size of rings and the size of different types of bicycle frames 15, there is a variability in the lateral and vertical angle at which the chain 6 engages the chain ring 5 in the engagement area 10 and in the lateral and vertical angle at which the chain 6 exits the chain ring 5 in the disengagement area 11.

Among the risks in riding a bicycle is the risk of the chain 6 becoming disengaged from the drive system (chain ring 5 and rear cassette). While it is inconvenient when a chain falls off when a rider is riding on a neighborhood path near their house, it can be dangerous when a rider is riding in an untraveled area on a mountain or wilderness area. While a rider may deliberately select drive gears so that the risk of chain disengagement due to the relative angles of the chain is reduced, not all variables can be controlled. Sticks and rocks and other items in the environment may come into contact with the chain while the rider is riding and also affect the angle of the chain. Accordingly, many riders may choose to incorporate a guide in order to help position the chain 6 as it enters the engagement area 10 or leaves the disengagement area 11 to minimize the risk of disengagement.

In the present illustration, the assembly 100 to be described and claimed in further detail herein is shown as being generally in the engagement area 10 of the front chain ring 5. In other embodiments, a functional equivalent of the assembly could be positioned in the disengagement area 11 of the front chain ring 5. In other embodiments, the assembly could be positioned in the engagement or disengagement areas of the rear cassette. A typical designer will be able to adjust the precise configuration of the assembly 100 to work in one of the other locations. As noted above, the chain 6 can be moved in the opposite direction from the direction 9, and accordingly, the disengagement area 11 can become an engagement area 10 when the arms 3, 4 are rotated counterclockwise.

Figure 22:
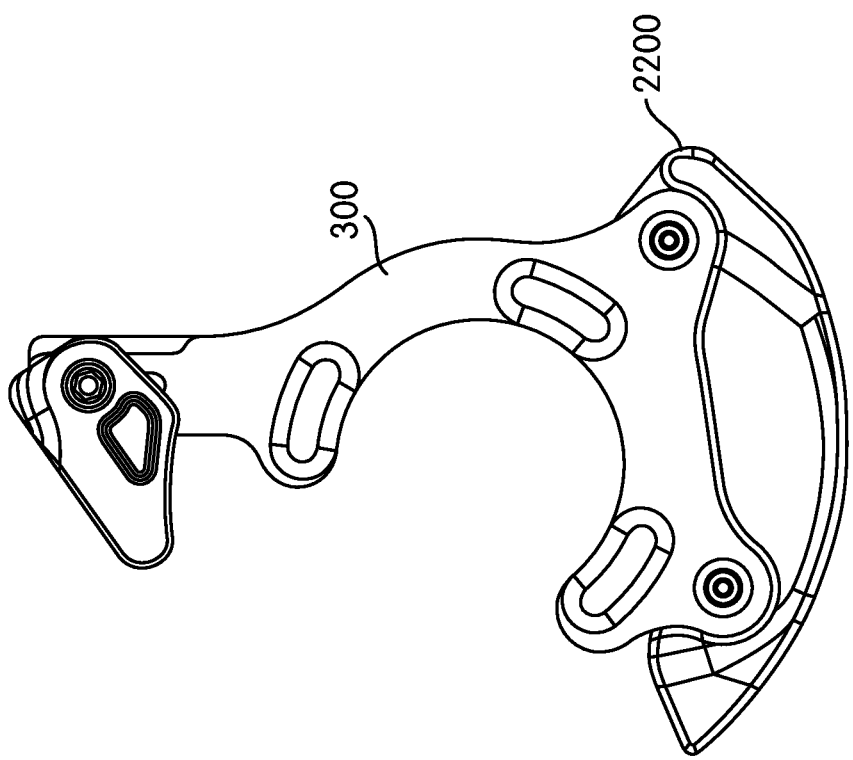
FIG. 22 is a view of a bracket and chain guide according to the disclosure and including a bash guard.

A first embodiment of the assembly 100 is shown in FIGS. 3-7. The assembly 100 may include a bracket 300 and a chain guide assembly 302. As shown in FIGS. 3-7, the bracket 300 may be configured to be attached to a bicycle frame 15 using an ISCG structure. This attachment structure is one of several that is conventional. Instead, the bracket 300 may be assembled to the bicycle frame 15 in any conventional manner, such as high mount or low mount. The bracket 300 shown is relatively simple. If desired, the bracket 300 may be more robust and may be configured to allow the attachment of a bash guard 2200 or other accessory that a designer may believe to be appropriate in a particular assembly 100, such as is seen in FIG. 22.

The present disclosure will refer to the adjustment of the chain guide or chain guide assembly in a variety of orientations. These orientations are best understood with respect to other structures on the bicycle. Returning to FIG. 2, the "lateral" orientation 12 is a direction that is generally parallel to the axis of the crank shaft 1. The "vertical" orientation 13 is a direction that is generally perpendicular to the lateral orientation 12 and generally perpendicular to the ground when a bicycle is in use. The "fore-aft" orientation 14 is a direction that is generally perpendicular to the lateral orientation 12 and to the vertical orientation 12 and that generally runs parallel to the overall axis of the bicycle frame 15. The "rotational" orientation is an orientation that rotates along any axis. As noted above, the bracket 300 may be attached to the bicycle frame 15 using any conventional structure. Because the bracket 300 can be adjusted into a variety of rotational and angular positions based on the mount, the orientations are referred to generally, rather than as precise orientations. For example, the vertical orientation 13 need not adjust the chain guide along an axis strictly perpendicular to the ground when the bicycle is in a riding position. Instead, the vertical orientation may vary several degrees from vertical. In the present disclosure, therefore, for clarity, the orientations may be referred to a being vertical, lateral, rotational, and fore-aft. But more commonly, they will be referred to numerically as a first, second, third, or fourth orientation. Any of the orientations referred to above may be, for example, a first orientation or, as another example, a second orientation, depending on the context. A typical designer will be able to easily understand these descriptions of orientations.

Figure 5:
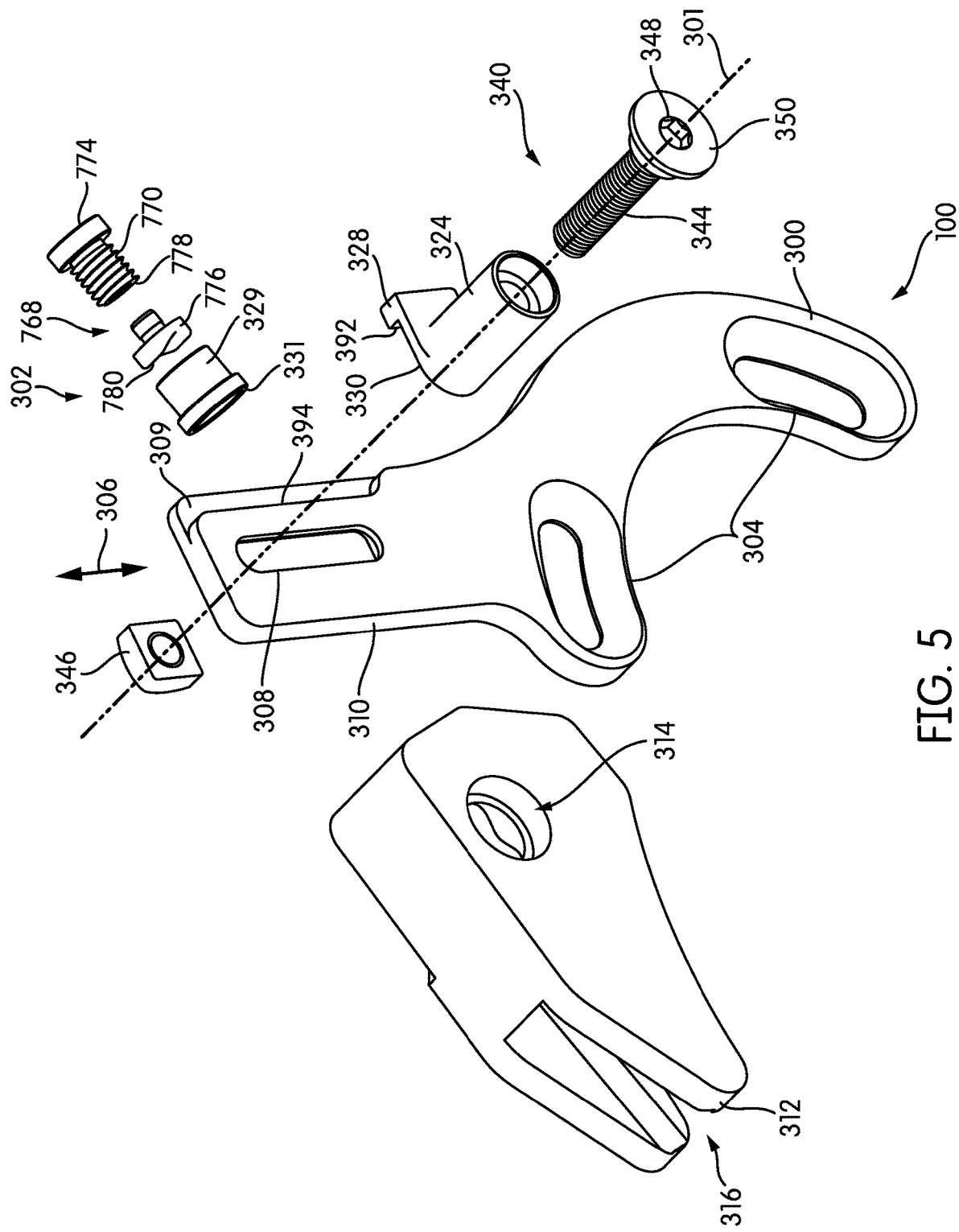
FIG. 5 is an exploded view of the assembly of FIGS. 3 and 4.

The structure of the first embodiment shown in FIGS. 3-7 may be most easily understood with reference to FIG. 5, which shows the assembly 100 and the chain guide assembly 302 in an exploded, unassembled view. As shown in FIG. 5, the assembly 100 may include a bracket 300 and a chain guide assembly 302. The bracket 300 may be configured to be attached to a bicycle frame 15 using the exemplary conventional mounting slots 304. In a conventional manner, a rider may select an appropriate bolt (which may be provided with the assembly 100 by the manufacturer or may be one the rider prefers) and insert the bolt through a mounting slot 304 and into a conventional threaded recess on a bicycle frame. Rotation of the bolt may attach the bracket 300 in an appropriate location and rotational placement on a bicycle. Conventionally, the bracket 300 may be attached to the bicycle and then the crank shaft 1, chain ring 5, and arms 3,4 are attached, such that the bracket 300 is attached between and adjacent the bicycle frame 15 and the chain ring 5, so that the bracket is positioned generally as shown in FIGS. 1 and 2. The bracket 300 may define a first slot 308 that may have a first orientation 306. The first orientation 306 may be generally a vertical orientation but may vary from vertical for a variety of reasons, such as those discussed above. The bracket 300 may define a first groove 309 that may be adjacent an outer periphery 310 of the bracket 300. The first groove 309 may alternatively be positioned away from the periphery 310 of the bracket 300.

The chain guide assembly 302 may be removably attached to the bracket 300. The chain guide assembly 302 may include a chain guide 312. The chain guide 312 may define a first channel 314, a second channel 315 (best seen in FIG. 7) and a third channel 316. The third channel 316 may be better seen and understood in the cross-sectional view of FIG. 6, in conjunction with the assembled views of FIGS. 1 and 2. The third channel 316 may be configured as a U-shaped channel with a first leg 318, a second leg 320, and a bottom 322. In some embodiments, the first leg 318 may be eliminated and the bracket 300 may function as the first leg 318. However, in many embodiments, the use of a first leg 318 on the chain guide 312 may be desirable for a variety of design reasons, including stability and the ability to select a material different from the material from which the bracket 300 is made. The chain guide 312 and third channel 316 may be designed and configured in a manner that the designer deems appropriate for use with a variety of bicycle frames 15, chain rings 5, and chains 6. The precise materials, shapes, and sizes are a matter of design choice based on the desires of the particular designer. Alternative chain guide profiles and shapes and sizes can be seen in FIGS. 12, 14, 18, and 19. These shapes, sizes and materials are exemplary.

The first channel 314 may be generally transverse to the third channel 316. A first sleeve 324 may be inserted within the first channel 314 defined by the chain guide 312, as may be best seen in FIGS. 5 and 6. In the embodiment shown in FIGS. 3-7, and particularly 5 and 6, the first sleeve 324 may include a first shoulder 326 on its inner surface. The first sleeve 324 may also include a finger 328 that extends from one end 330 of the first sleeve 324.

The second channel 315 may extend generally transverse to the first channel 314 in the same general direction as the third channel 316. As may be seen most clearly in FIG. 7, the second channel 315 may include a second shoulder 327. A second sleeve 329 may be inserted in the second channel 315 and may include a third shoulder 331 that may abut against the second shoulder 327 in the second channel 315.

As may be apparent to one of ordinary skill in the art from a close examination of the FIGS, the first channel 314, second channel 315, and third channel 316 may all be interconnected. In some embodiments, for ease of manufacturing, it may be more efficient to use a single mold with interconnecting inserts to manufacture the part or to machine out the channels in an interconnected manner. However, because there are at least three distinct functions for the three channels, the three channels are discussed and labeled separately for ease of understanding. A typical designer will be able to make an appropriate design choice for the formation of the chain guide with an appropriate number and style of channel, based on that designer's particular style considerations.

Using the system of the first channel 314 and the second channel 315, the assembly 100 may be flexibly used to lock the orientation of the chain guide 312 into each of at least a first orientation and a second orientation independently of one another. The use of multiple channels and locks may also allow the placement of the chain guide 312 into the plurality of orientations to be along a common, shared, first axis, such as the first axis 301.

Figure 6:
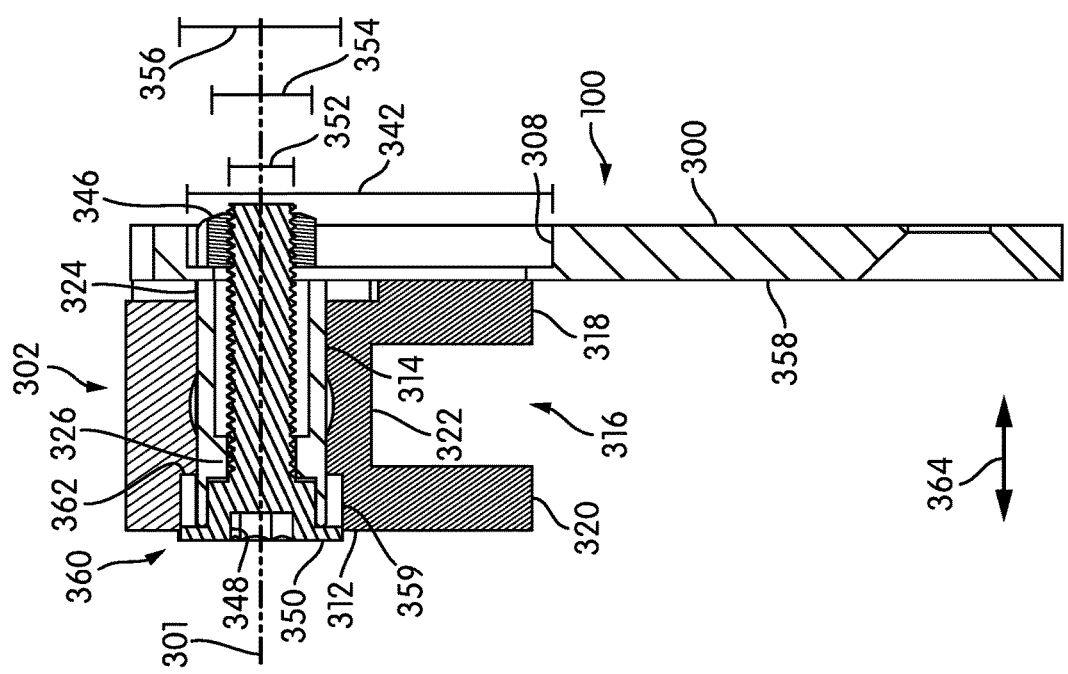
FIG. 6 is a cross-sectional view of the assembly of FIGS. 3-5 taken along line C-C of FIG. 3.

The first axis 301 may be defined by a first lock 340 or the first bolt or connector 344. The first lock 340 may be capable of releasably mounting the chain guide 312 in any position along a length 342 (see FIG. 6) of the first slot 308. The first lock 340 may include a first bolt 344 that extends at least partially through or is positioned at least partially within the first channel 314. In many embodiments, the first axis 301, the first lock 340, the first connector 344 and the first channel 314 may be substantially perpendicular to the first slot 308 and the direction of travel in the first orientation 306. The first lock 340 may also include a first nut 346 that is capable of mating with the first bolt 344. While the use of a bolt and nut that are compatibly threaded, such as first bolt 344 and first nut 346, is conventional, alternative configurations would be possible and a designer can select from many other conventional design choices. When the first bolt 344 is inserted through the first sleeve 324 and through the slot 308, it can then engage the first nut 346. In some embodiments, such as the one illustrated, it may be desirable for the first nut 346 to be held in place and the first bolt 344 positioned in its tightened and locked position (as shown in FIG. 6) by inserting a hex wrench (or other conventional tightener) into the appropriately configured cavity 348 on the head 350 of the first bolt 344. When the first lock 340 is in this locked position, the chain guide 312 may be releasably mounted in a position along the length 342 of the first slot 308. In another embodiment, instead of using a head 350 with a cavity 348 to be driven by a hex wrench, a designer may substitute a conventional quick-release system (not shown) or another conventional structure.

The relative size of the head 350 of the first bolt 344, the sleeve 324 and the first channel 314 may be configured in a variety of ways to restrict the movement of other parts of the chain guide assembly 302. As may be most clearly seen in FIG. 6, the sleeve 324 may have a first inner diameter 352. The head 350 of the first bolt 344 may have a second outer diameter 356. The first cavity 314 may have a third inner diameter 354. The second diameter 356 of the head 350 of the first bolt 344 may be greater than the first diameter 352 or both the first diameter 352 and the third diameter 354. If the second diameter 356 of the first bolt head 350 is greater than the first diameter 352 of the sleeve 324, then when the first lock 340 is moved into its locked position, movement of the sleeve 324 in a second, lateral orientation along the first axis 301 may be restricted to the lateral space or distance between the side 358 of the bracket 300 and the bolt head 350. Similarly, if the second diameter 356 of the first bolt head 350 is larger than the third diameter 354 of the first channel 314, then when the first lock 340 is moved into its locked position, movement of the chain guide 312 in a second, lateral orientation along the first axis 301 may be restricted to the lateral space or distance between the side 358 of the bracket 300 and the bolt head 350. In some embodiments, it may be desirable to include a wider opening recess, such as the recess 359, and a shoulder, such as the shoulder 362, adjacent the outer opening 360 of the first recess 314 of the chain guide 312 to better tune the amount of movement in the second orientation available to the chain guide 312 when the first lock 340 is in its locked position.

If the second diameter 356 is greater than the first diameter 352 and the third diameter 354, the assembly of the chain guide 312 and chain guide assembly 302 onto the bracket 300, by only partially tightening or partially locking the first lock, means that the chain guide assembly 302 may be retained with the bracket for storage either on or off a bicycle so that the chain guide 302 does not become separated and lost. In some embodiments, however, a different configuration may be desirable.

Figure 15:
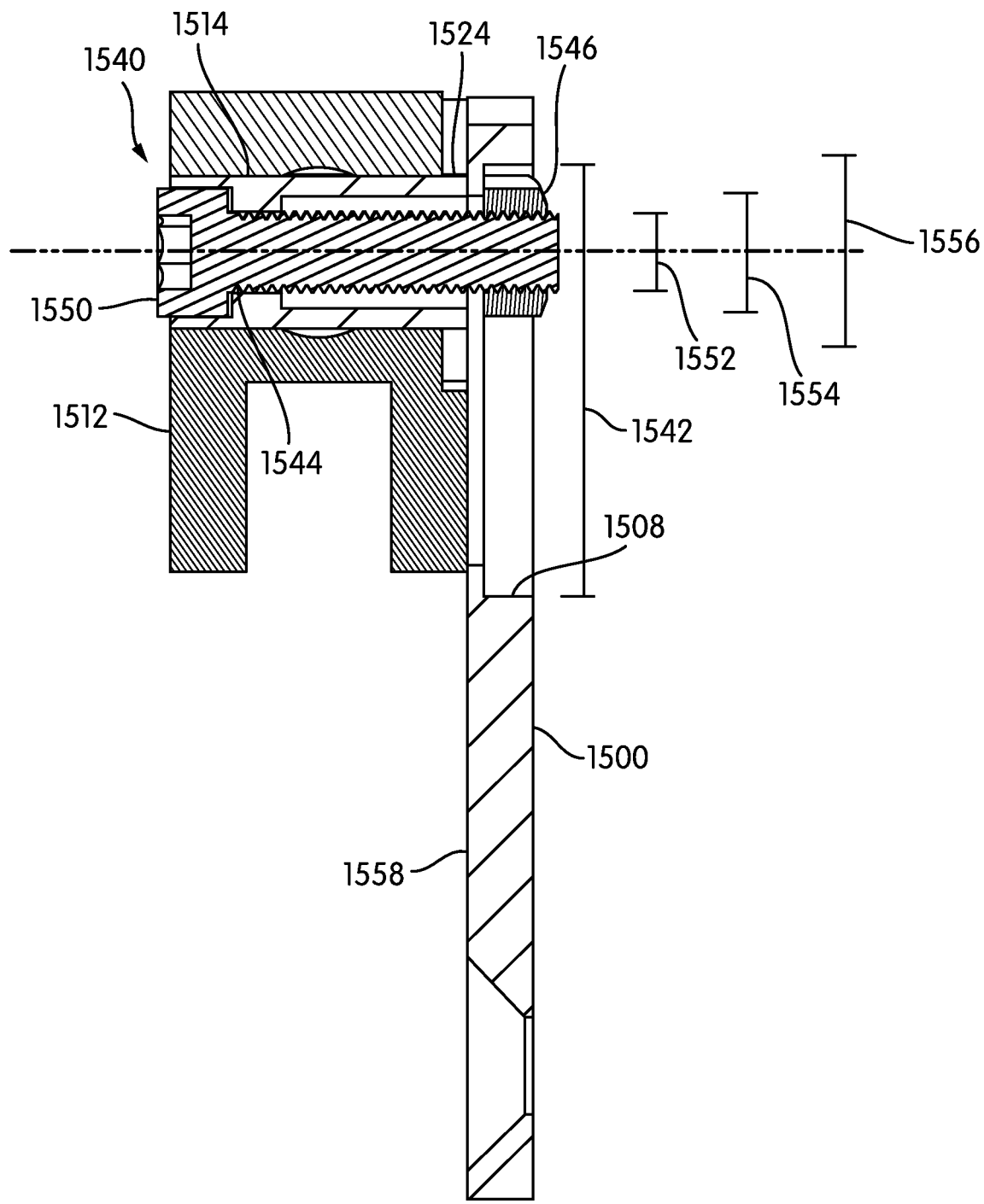
FIG. 15 is partial sectional view of yet another embodiment showing a connector having a smaller head.

Turning to FIG. 15, in this embodiment, the parts of the embodiment differ from the embodiment of FIGS. 3-7 only in the ways that are specifically mentioned as being different from the embodiment of FIGS. 3-7. As in the embodiment of FIGS. 3-7, the first lock 1540 may include the first bolt 1544 and the first nut 1546 that are capable of releasably mounting the chain guide 1512 to the bracket 1500 in a position along the length 1542 of the first slot 1508. Also in this embodiment, the second diameter 1554 of the bolt head 1550 is greater than the first diameter 1552 of the sleeve 1524. However, the second diameter 1554 of the bolt head 1550 is smaller than the third diameter 1556 of the first channel 1514. Accordingly, in this embodiment, movement of the sleeve 1524 in the second orientation is restricted to being between the side 1558 of the bracket 1500 and the bolt head 1550. However, movement of the chain guide 1512 is not so restricted. Without engaging the second lock (as will be described below), the chain guide 1512 has an unrestricted movement in the second orientation and may be removed from the assembly and bicycle.

Figure 16:
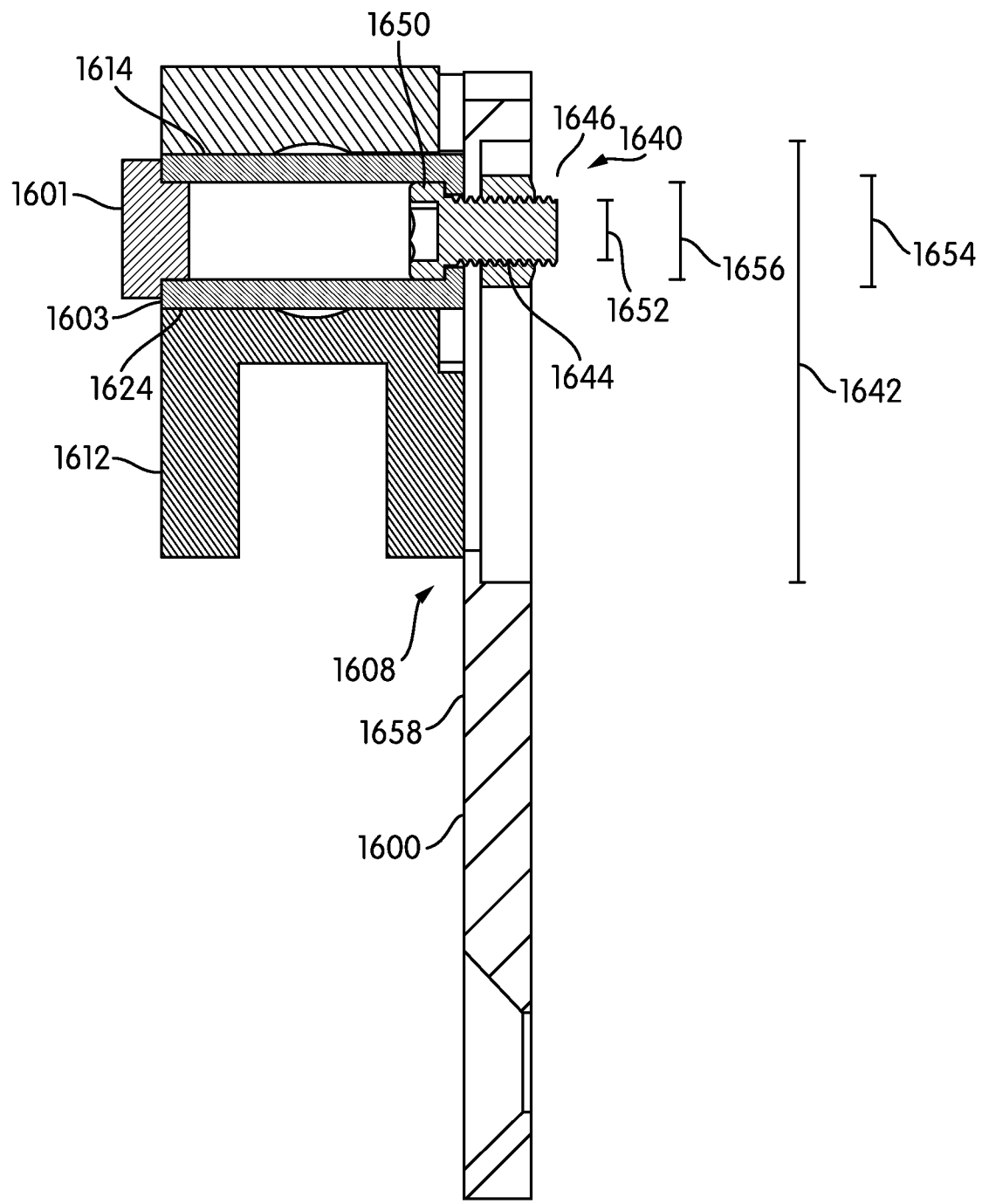
FIG. 16 is a partial sectional view of yet another embodiment showing a different embodiment of a connector.

The embodiment of FIG. 16 shows an extreme example of the embodiment of FIG. 15, where the bolt head 1650 is positioned well inside the sleeve 1624. The parts of the embodiment differ from the embodiment of FIGS. 3-7 only in the ways that are specifically mentioned as being different from the embodiment of FIGS. 3-7. As in the embodiment of FIGS. 3-7, the first lock 1640 may include the first bolt 1644 and the first nut 1646 that are capable of releasably mounting the chain guide 1612 to the bracket 1600 in a position along the length 1642 of the first slot 1608. Also in this embodiment, the second diameter 1656 of the bolt head 1650 is greater than the first diameter 1652 of the sleeve 1624. However, the second diameter 1656 of the bolt head 1650 is smaller than the third diameter 1654 of the first channel 1614. Accordingly, in this embodiment, movement of the sleeve 1624 in the second orientation is restricted to being between the side 1658 of the bracket 1600 and the bolt head 1650. However, movement of the chain guide 1612 is not so restricted. Without engaging the second lock (as will be described below), the chain guide 1612 has an unrestricted movement in the second orientation and may be removed from the assembly and bicycle. If the structure of FIG. 16 is used, it may be desirable to include a removable cap, such as the cap 1601 on the open end 1603 of the sleeve 1624 so that dirt and debris do not enter the sleeve 1624 and so that no other structures can get caught on or in the open end 1603 of the sleeve 1624.

Figure 17:
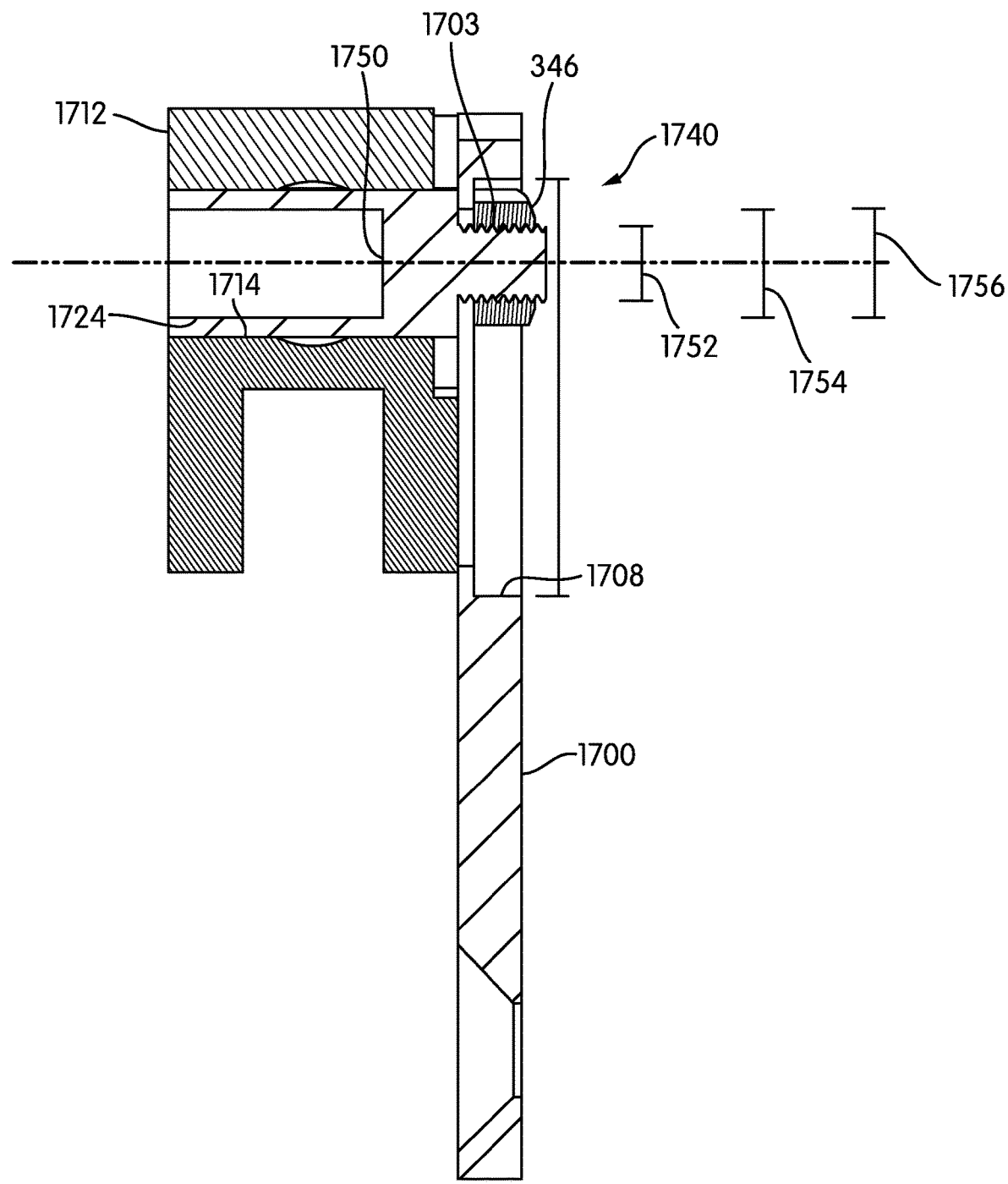
FIG. 17 is a partial sectional view of yet another embodiment showing a different embodiment of a connector.
Figure 18:
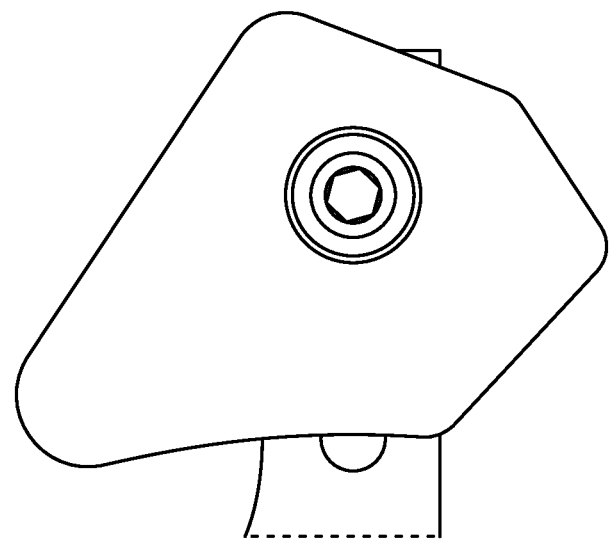
FIG. 18 is a side view of an alternative profile of a chain guide.
Figure 19:
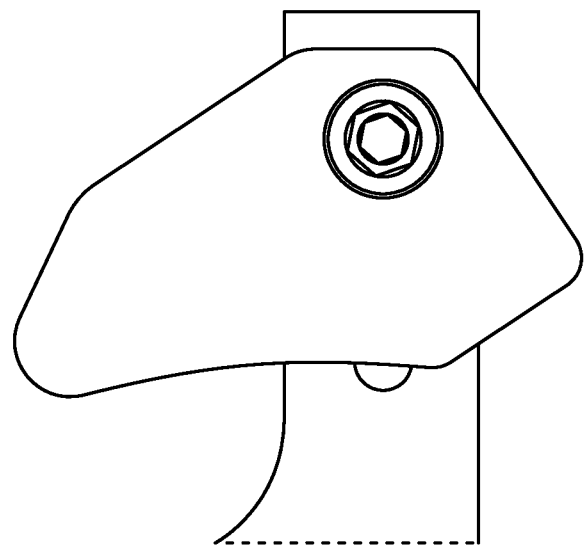
FIG. 19 is a side view of another alternative profile of a chain guide.

The embodiment of FIG. 17 shows a further example of a first lock 1740. The parts of the embodiment differ from the embodiment of FIGS. 3-7 only in the ways that are specifically mentioned as being different from the embodiment of FIGS. 3-7. In this embodiment, the first sleeve 1724 includes a projection 1703 that is capable of extending through the slot 1708 in the bracket 1700 to releasably mount the chain guide 1712 in the first orientation. Manufacturing of such a structure, such as by over molding a bolt may be required or using a different conventional configuration of first lock 1740 may be advantageous if such a structure is used. The sleeve 1724 may have a first inner diameter 1752. Because the sleeve 1724 may be integrally formed with the projection 1703, the first cavity 1714 may have a third inner diameter 1754 that is substantially the same as the second diameter 1756 of the effective "head" 1750. The second diameter 1756 and the third diameter 1754 may both be greater than the first inner diameter 1752.

In the above discussion, it was noted that depending on the relative diameters and sizes of a portion of the first lock 340, the sleeve 342, and the first channel 314, the chain guide 312 would be able to move in a second orientation when the first lock 340 is in its locked position. The second orientation discussed was the lateral direction, that is laterally in the direction 364 in FIG. 6 along the axis 301. However, until the second lock is engaged, the guide 312 is also permitted to move rotationally, such as the direction noted as 366 in FIG. 7. This rotation is also about the axis 301. Accordingly, movement of the chain guide 312 is made in a first orientation, a second orientation, and a third orientation about a single axis 301, which in many embodiments is coaxial with a portion of the first lock 340. When the first lock 340 is in its locked position so that the chain guide 312 is positioned in a single position along one orientation, such as a first orientation or, in many embodiments a substantially vertical orientation, the chain guide is still free to move or unlocked with respect to at least a second orientation, such as one of a lateral position or a rotational position, and a third orientation, such as the other of the lateral position or rotational position. If, for example, the first channel 314 and the bolt head 350 were sized and shaped such that the bolt head were to come into contact with the first channel 314 when the first lock 340 is in its locked position, the second orientation in which the chain guide would be free to move may be the rotational orientation.

Figure 7:
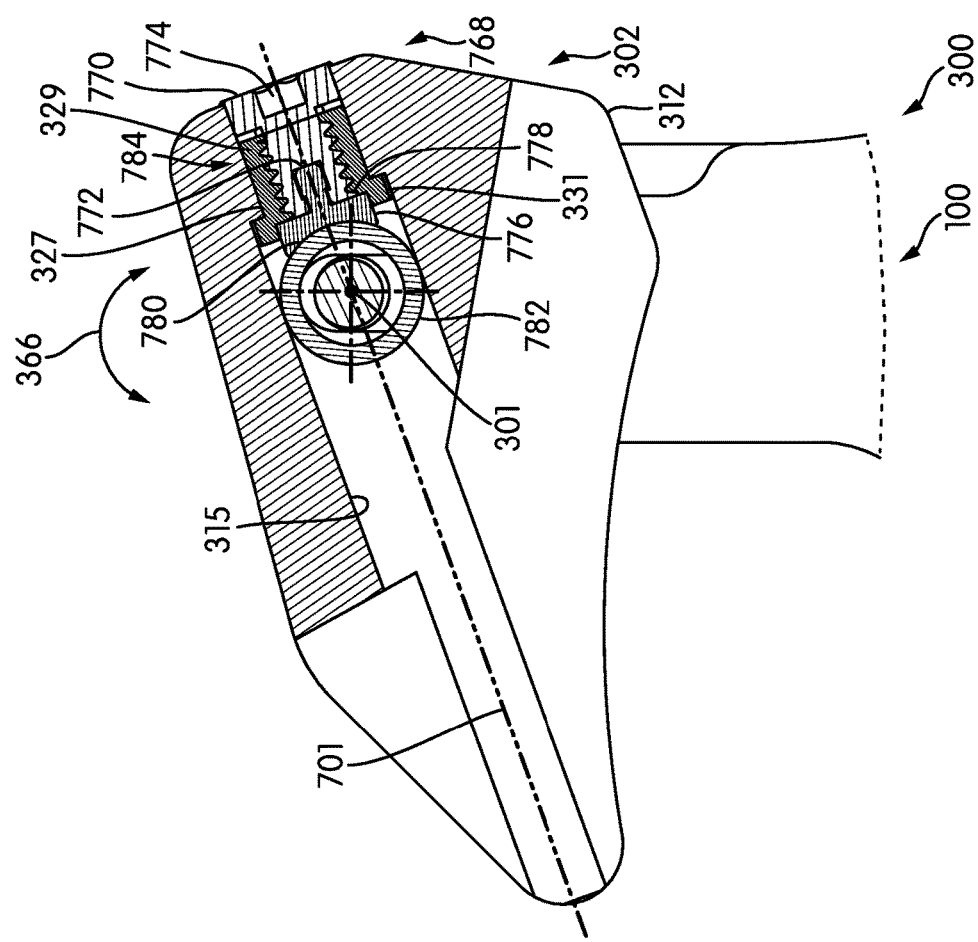
FIG. 7 is a cross-sectional view of the assembly of FIGS. 3-5 taken along line B-B of FIG. 4.

Returning to the embodiment of FIGS. 3-7, the chain guide 312 may be locked in at least a second orientation by a second lock 768, which is best seen in FIGS. 5 and 7. As previously discussed above, the second lock 768 may be at least partially positioned within the second channel 315 and the second lock 768 may include a second sleeve or nut 329 that may be positioned in the second channel 315. A second bolt 770 may have a second bolt head 772 with a recess 774 for the insertion of a hex wrench or other device capable of rotating the second bolt 770. In some embodiments, an interface 776 may be attached in a conventional manner to or within a free end 778 of the second bolt 770. In some embodiments, the interface may include a curved surface 780 configured to mate with the curved outer surface 782 of the first sleeve 324. When the second bolt 770 is tightened, the curved surface 780 of the bolt assembly 784 may meet the curved outer surface 782 of the sleeve 324. This engagement of the two surfaces 780, 782 may releasably mount the chain guide 312 in at least a second orientation, such as a rotational orientation, or it may releasably mount the chain guide 312 in a second orientation, such as a lateral orientation, and a third orientation, such as a rotational orientation. In this embodiment, the axis 701 along which the second lock 768 is engaged may be substantially perpendicular to the axis 301 about which the first lock 340 is engaged and about which the chain guide 312 may move in the first, second and third orientations.

The chain guide 312 may be able to be separately adjusted about a first axis 301 in a first, second and third orientation, and the first axis 301 may be defined by the first connector 340. The chain guide 312 may be able to be locked with a first lock 340 in a first orientation. The chain guide 312 may be free to move in the second orientation or the second and third orientations after the first lock 340 is engaged. Also, the chain guide may be able to be locked in the second orientation or the second and third orientations with a second lock 768. The chain guide 312 may be free to move in the first orientation after the second lock 768 is engaged. Accordingly, each of the first lock 340 and the second lock 768 may independently orient the chain guide 312 relative to the bracket 300. The release or unlocking of each of the first lock 340 and the second lock 768 may allow movement of the chain guide 312 in one respective orientation without affecting the orientation of the chain guide 312 in the orientation corresponding to the other lock 340, 768.

Figure 23:
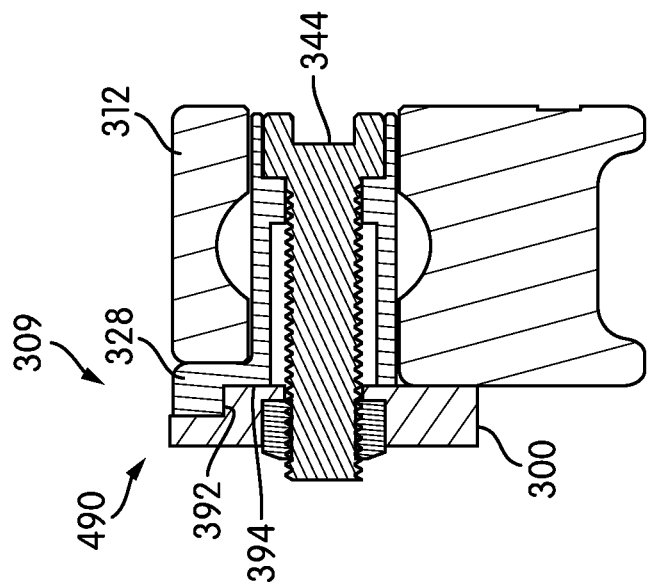
FIG. 23 is a cross-sectional view taken along line D-D of FIG. 3.

The chain guide assembly 302 may further include a guide 490 that may be configured to retain the chain guide 312 in at least the second orientation when the first lock 340 is in its unlocked position. As noted above, the second lock 768 may lock the chain guide into position in at least the second orientation when the second lock 768 is in its locked position. This second lock 768 may position the chain guide 312 relative to the sleeve 324. The interaction of the sleeve 324 and the bracket 300 form a guide 490 (best seen in FIGS. 4,5, and 23) that functions to retain the chain guide 312 in its position in at least the second orientation when the first lock 340 is in an unlocked position, such as by loosening the first bolt 344. When the first bolt 344 is loosened, the chain guide is free to move in a path governed by the movement axis 301 along the first slot 308 in the first bracket 300. As noted above, a finger 328 may project from the first end 330 of the sleeve 324. The finger 328 may be configured to mate with the first groove 309 in the bracket 300. Because the first finger 328 has a surface 392 that mates with a corresponding surface 394 of the groove 309, the cooperation and interfitting of these parts function as a guide 490 that minimizes or eliminates the movement of the chain guide 312 in at least the second direction while the rider adjusts the chain guide 312 in the first orientation and resecures the first lock 340 in the locked position.

In addition to the structures described above in connection with the various embodiments, there are additional alternative embodiments of the second lock structure. Three alternative embodiments are shown in FIGS. 8, 9-11, and 12-13. Each of these embodiments varies only the profile of the chain guide and the structure of the second lock. The other structures previously described in connection with the above embodiments, but that are not described in connection with the alternative embodiments, are the same and are therefore not described in detail. The embodiment of FIGS. 3-7 may be referred to as "the first embodiment", even though various alternative structures possible for that embodiment were discussed.

Figure 8:
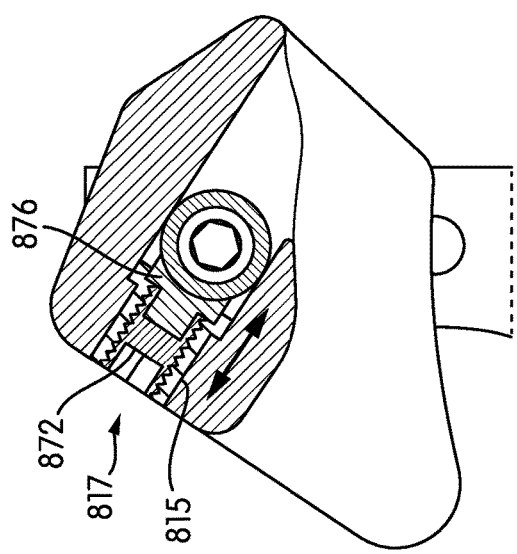
FIG. 8 is a cross-sectional view of another embodiment of the assembly in a position similar to that of FIG. 6.

The alternative embodiment of FIG. 8 is very similar to the structure of the first embodiment. However, in some situations, it may be preferred to have the second channel 815 with its upper end 817 towards the rear of the bicycle (not shown). In addition, the interface 876 illustrated in FIG. 8 has a somewhat different contour providing a different attachment structure to the second bolt 872. A designer will be able to select an appropriate configuration depending on the appropriate design choices.

Figure 9:
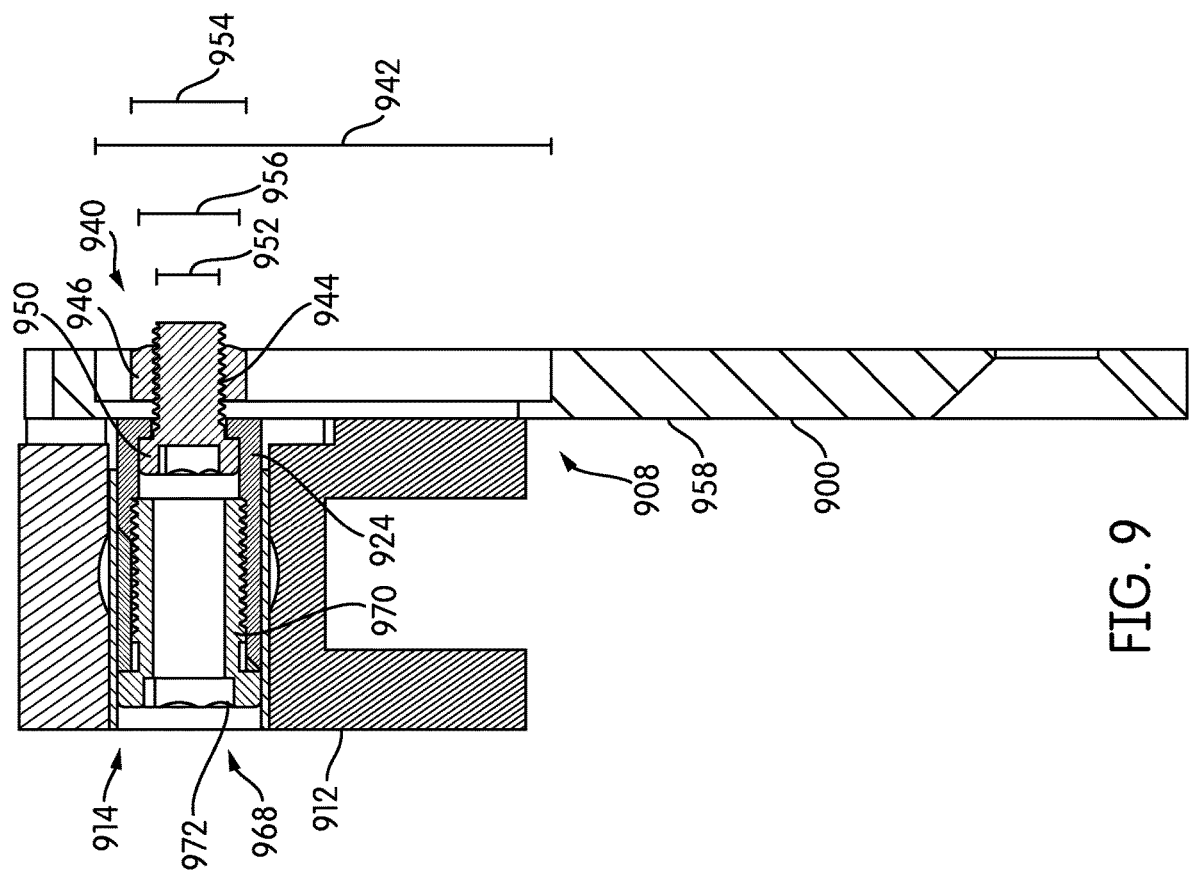
FIG. 9 is a cross-sectional view of yet another embodiment of the assembly in a position similar to that of FIG. 6.
Figure 10:
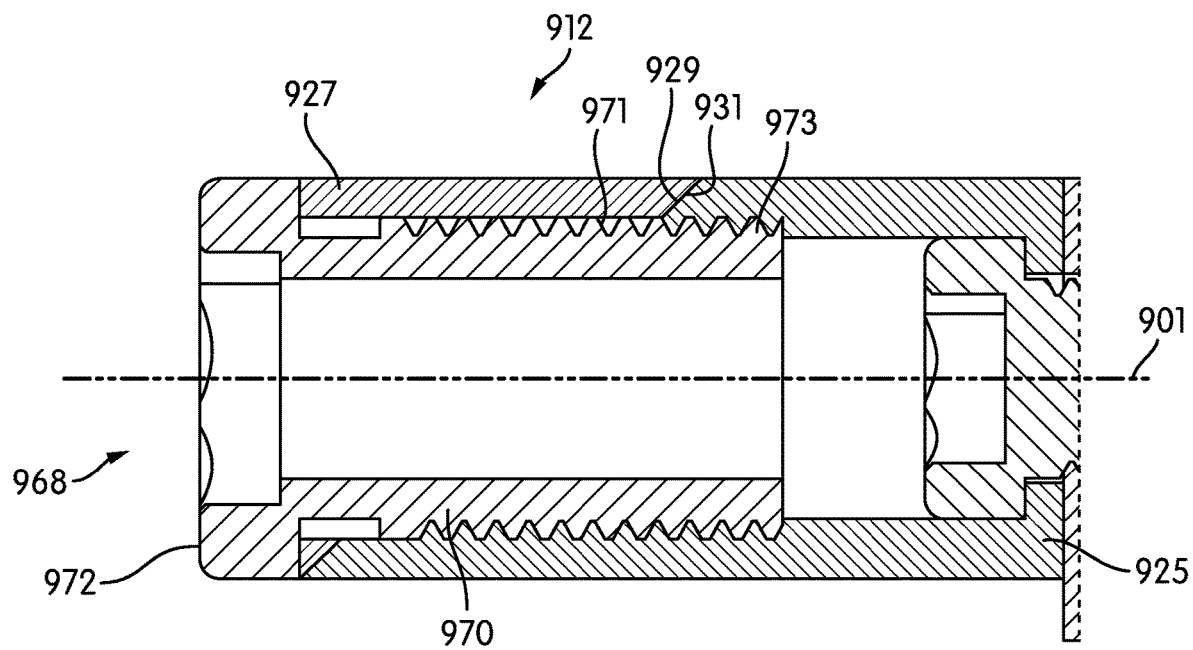
FIG. 10 is an enlarged view of a portion of FIG. 9 showing the second lock in the unlocked position.
Figure 11:
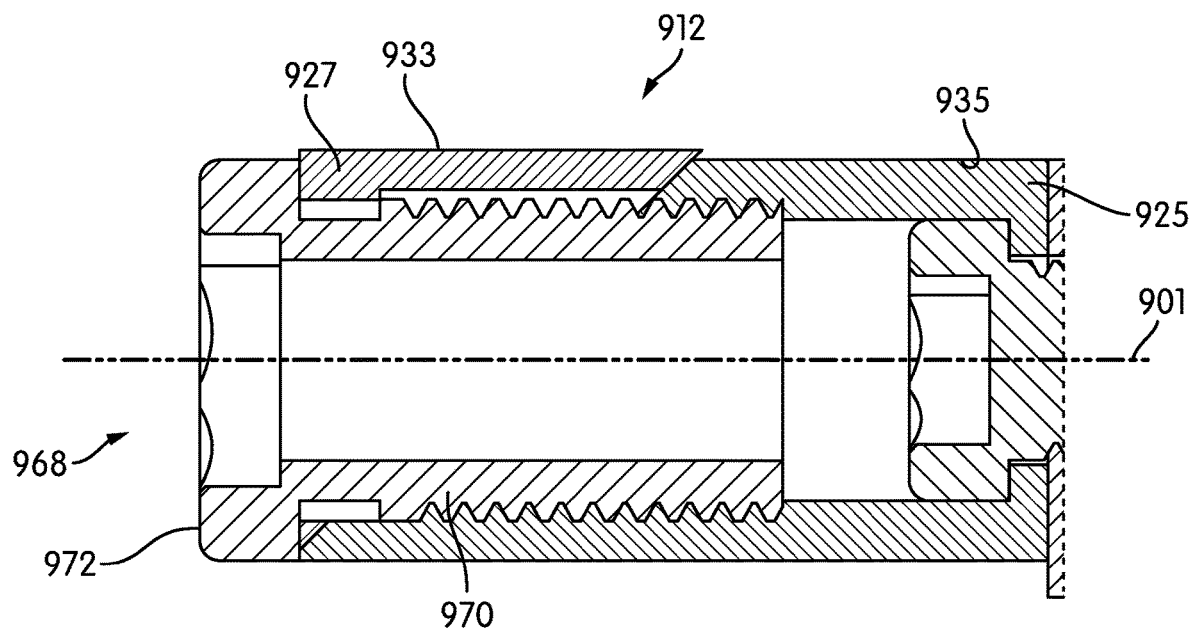
FIG. 11 is the enlarged view of FIG. 10 showing the second lock in the locked position.

A second alternative embodiment is shown in FIGS. 9-11. FIG. 9 shows this alternative embodiment. FIG. 10 shows the second lock 968 in the unlocked position. FIG. 11 shows the second lock 968 in the locked position. The embodiment of FIG. 9 is similar to the embodiment of FIG. 16, where the bolt head 950 is positioned well inside the sleeve 924. The first lock 940 may include the first bolt 944 and the first nut 946 that are capable of releasably mounting the chain guide 912 to the bracket 900 in a position along the length 942 of the first slot 908. Also in this embodiment, the second diameter 956 of the bolt head 950 is greater than the first diameter 952 of the sleeve 924. However, the second diameter 956 of the bolt head 950 is smaller than the third diameter 954 of the first channel 914. Accordingly, in this embodiment, movement of the sleeve 924 in the second orientation is restricted to being between the side 958 of the bracket 900 and the bolt head 950. However, movement of the chain guide 912 is not so restricted. Without engaging the second lock (as will be described below), the chain guide 912 has unrestricted movement in the second orientation and may be removed from the assembly and bicycle.

The chain guide 912 may be locked in at least a second orientation by a second lock 968. The structure and function of the second lock 968 may be best seen by comparing FIG. 11, showing the second lock 968 in a locked configuration, with FIG. 10, showing the second lock 968 in an unlocked configuration. In this embodiment, the second lock 968 may be at least partially positioned within the first channel 914. Using a single channel 914 defined by the chain guide 912 both for portions of the first lock 940 and portions of the second lock 968 may simplify manufacturing of the chain guide 912.

In the embodiment of FIGS. 9-11, the sleeve 924 may include a first sleeve portion 925 and a second sleeve portion 927. In some embodiments, it may be desirable to make the first sleeve portion 925 and the second sleeve portion 927 as a single piece and divide it into two portions. In other embodiments, it may be desirable to manufacture the first sleeve portion 925 and the second sleeve portion 927 as separate pieces, due to the internal threading on the first sleeve portion 925, as will be described below. The first sleeve portion 925 may include the finger described in connection with the embodiment of FIGS. 3-7 and many other features of the sleeve as described in connection with that feature. In many embodiments, the first sleeve portion 925 may include an angled end face 929 and the second sleeve portion 927 may include a corresponding angled end face 931. In many embodiments, it may be desirable for each angled end face 929, 931 to have substantially the same angle, so that in the unlocked position in FIG. 10, the two end faces 929, 931 can rest against each other. However, it may be desirable in some embodiments for the angled end faces 929, 931 to have different angles to achieve different rates of locking.

In the embodiment of FIGS. 9-11, the second lock 968 may include a second bolt 970 that may be at least partially positioned within the first channel 914. The second bolt 970 may have a bolt head 972 with a recess for the insertion of a hex wrench or other device capable of rotating the bolt 970. External threads 971 on the second bolt 970 may mate with internal threads 973 on the first sleeve portion 925. When the rider tightens the second bolt 970, the bolt head 972 may move towards the first sleeve portion 925 and move the second sleeve portion 927. The pressing together of the respective end faces 929, 931 of the first and second sleeve portions 925, 927, respectively, may tend to move the second sleeve portion outwardly away from the axis 901. This movement may cause the outer surface 933 of the second sleeve portion 927 to frictionally engage the inner surface 935 of the first channel 914, thereby locking the chain guide 912 in place in at least the second orientation. In this embodiment, this action of the second lock 968 may lock the chain guide 912 in a second orientation and a third orientation, such as laterally and rotationally. In this embodiment, the axis 901 along which the second lock 968 is engaged may be substantially identical to the axis 901 about which the first lock 940 is engaged and about which the chain guide 912 may move in the first, second and third orientations.

Figure 12:
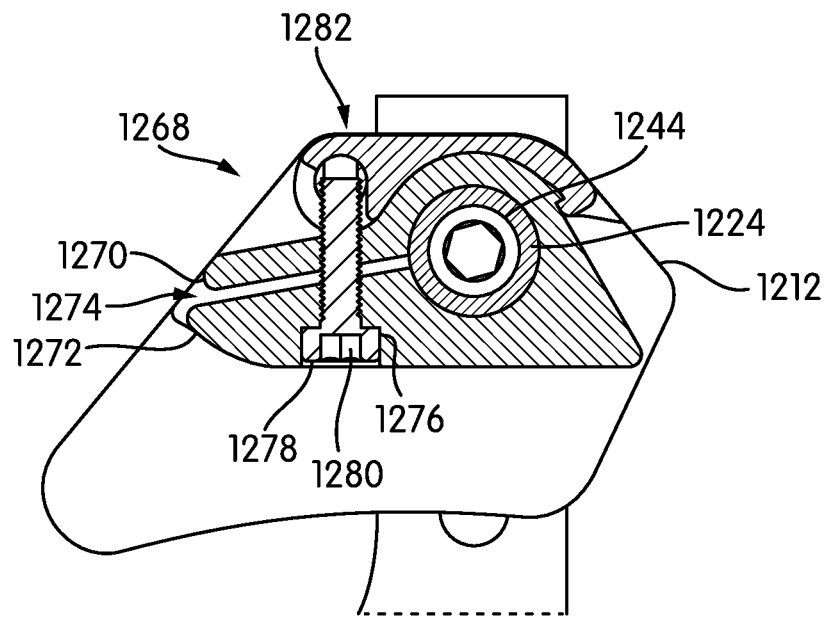
FIG. 12 is a cross-sectional view of yet another embodiment of the assembly in a position similar to that of FIG. 6 showing the second lock in a locked position.
Figure 13:
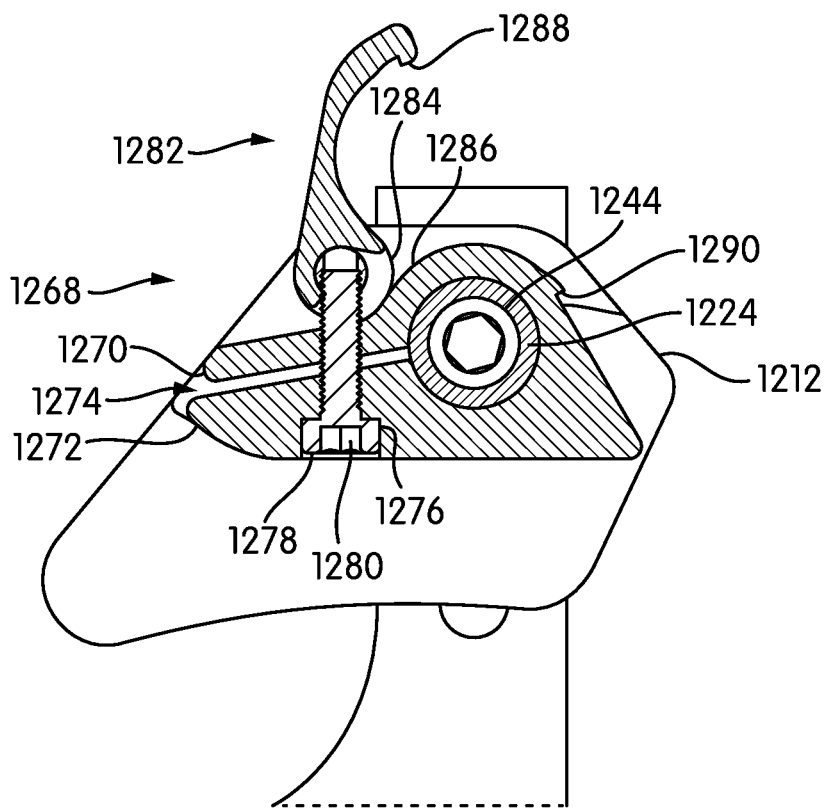
FIG. 13 is a cross-sectional view of the embodiment of FIG. 12 showing the second lock in an unlocked position.

Another alternative embodiment is shown in FIGS. 12 and 13. FIG. 12 shows the second lock 1268 in the locked position and FIG. 13 shows the second lock 1268 in the unlocked position. In the embodiment of FIGS. 12 and 13, a central portion of the chain guide 1212 may be configured with a first finger 1270 and a second finger 1272 defining a space or gap 1274 therebetween. A cavity 1276 may be made transversely through the first finger 1270 and the second finger 1272. A bolt 1278 may be placed in the cavity 1276 and may be secured in place with a rotatable lever assembly 1282 that includes an interior thread to mate with the thread on the bolt 1278 in conventional fashion when a hex wrench is used in the recess 1280 in the head of the bolt 1278 to tighten it. When the lever assembly 1282 is in its released position, as shown in FIG. 13, the space 1274 may be great enough that a small gap may be created between the chain guide 1212 and the sleeve 1224. This small gap may allow the chain guide 1212 to move in at least a second orientation when the first connector 1244 is positioned in locked position. When the rider selects a position for at least a second orientation, such as the lateral orientation, the rotational orientation, or both, the rider may rotate the rotatable lever assembly 1282 into the locked position shown in FIG. 12. The corresponding cam surfaces 1284 on the lever assembly 1282 and 1286 on the first finger 1270 may press the first finger 1270 toward the second finger 1272 and reduce the size of the gap 1274 and the corresponding space around the sleeve 1224. This rotation of the rotatable lever assembly 1282 may lock the chain guide 1212 in place with respect to at least the second orientation. In some embodiments, the rotatable lever assembly may include a lip 1288 that may interfit with a groove 1290 on the chain guide 1212 to minimize the risk of the second lock unlocking while the bicycle is in use.

In some embodiments, the adjustment of the chain guide in the first orientation relative to the bracket may be relatively consistent regardless of conditions.

Figure 14:
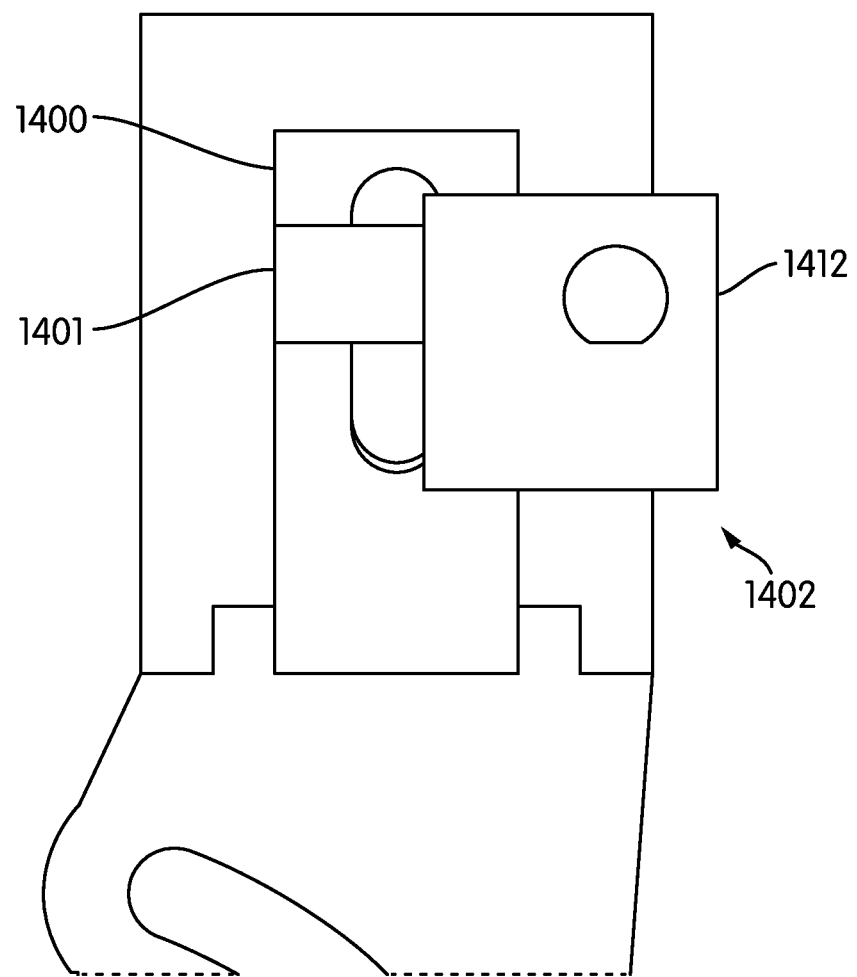
FIG. 14 is a partial view of another embodiment of the assembly.

In some embodiments, it may be desirable to incorporate an additional structure that allows the chain guide to be adjusted in a fourth orientation, such as a fore-aft orientation. Turning to FIG. 14, it is possible to include a second bracket 1401 in addition to the first bracket 1400. In such an embodiment, the second bracket 1401 may be secured in a first orientation using a first connector (not shown) like that used in the previous embodiments to secure the second bracket 1401 in a position along a first orientation, such as a vertical orientation. The second bracket 1401 may include a second slot (not shown) that allows a second connector like the first connector disclosed in connection with previous embodiments to be used to secure the chain guide 1412 in a position along a second orientation, such as a fore-aft orientation. The chain guide assembly 1402 could include a second lock like that contemplated in previous embodiments to secure the chain guide 1412 in at least a third orientation, such as a lateral orientation or rotational orientation, or both.

Figure 20:
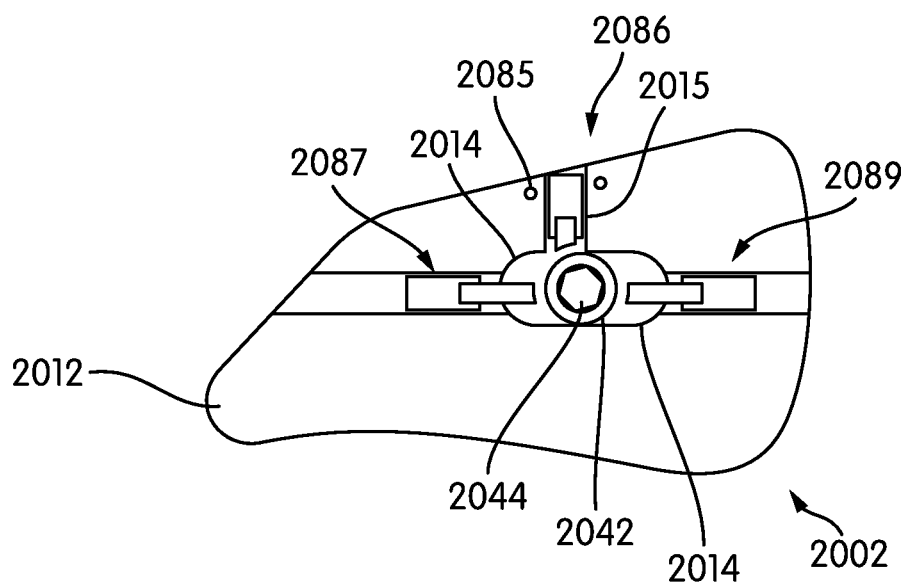
FIG. 20 is a partial sectional view of yet another embodiment of a chain guide assembly.
Figure 21:
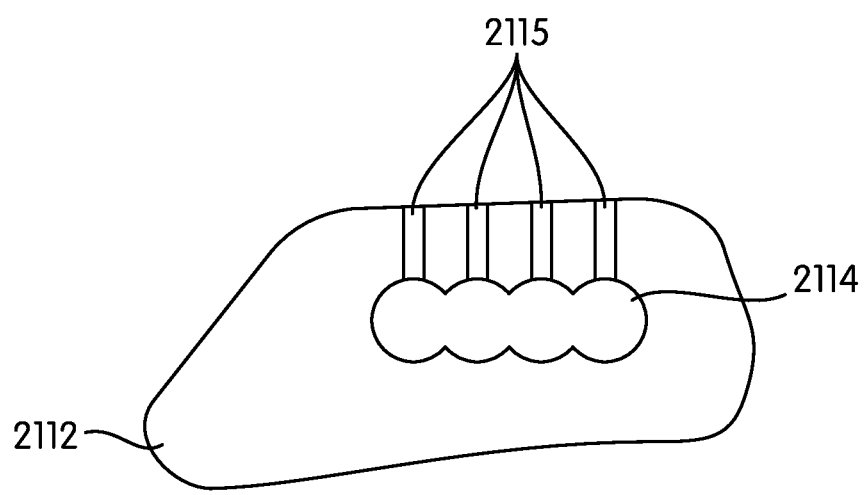
FIG. 21 is a partial sectional view of yet another embodiment of a chain guide.

Turning now to FIG. 20, a further embodiment is disclosed. In this embodiment, the structure of the chain guide assembly 2002 is similar to that disclosed in prior embodiments. However, the configuration of the first channel 2014 and the second channel 2015 are modified. In the embodiment of FIG. 20, the first connector 2044 may be configured to lock the chain guide 2012 in position relative to the first orientation, as was common in prior embodiments. However, in the embodiment of FIG. 20, the chain guide 2012 may be permitted to move with respect to a second orientation, a third orientation, and a fourth orientation, such as a lateral orientation, a rotational orientation, and a fore-aft orientation. The first channel 2014 may be configured as a slot to allow the chain guide 2012 to move in a fourth, fore-aft orientation as the first connector 2044 and sleeve 2042 translate along the slot. In such an embodiment, the second lock may also require modification to allow the chain guide 2012 to be positioned in a position along at least the second orientation. This embodiment could use a single second lock structure 2086 that is mounted with an elastomer, as at 2085, to allow the angle of the second lock structure to vary to position a portion of the second lock against the sleeve 2042. Instead, the second lock could include a first portion 2087 and a second portion 2089 which would cooperate to position the sleeve 2042 between the two lock portions and hold it in place, thereby positioning the chain guide 2012 in at least a second orientation. A different construction could include a lobed slot, such as the lobed channel 2114 shown in FIG. 21. In such a configuration, each lobe of the lobed slot could be adjacent a second channel 2115, and the second lock could be configured to be removably placed in each second channel to secure the chain guide 2112 in a particular second position, such as a fore-aft position.

An assembly technique described with reference to the embodiment of FIGS. 3-7 is now described. A person having ordinary skill in the art will understand that any of the other embodiments of a first or second lock could be used instead of the described embodiment. When a rider installs the present assembly 100 onto a bicycle for the first time, the rider may place the finger 328 of the sleeve along the groove 309 of the bracket 300 and (if applicable) slide the guide 312 onto the sleeve 324. The rider may then insert the first connector 344 through the sleeve 324 and at least partially attach it or lock it in place using the first nut 346. The rider may then move the connector 344 along the slot 308 until the guide 312 is in an appropriate location in the first orientation, a substantially vertical orientation, and when it is appropriately positioned, will use the first lock 340 to lock the chain guide 312 into a particular location relative to the first orientation. Then, the rider may move the chain guide 312 so that it has an appropriate position in at least the second orientation, such as a lateral orientation or rotational orientation, or second and third orientation, such as both a lateral and a rotational orientation. The rider may then engage the second lock 768 and lock the chain guide 312 in an appropriate position of at least the second orientation. The rider may then adjust the chain guide 312 relative to the chain 6 until the rider is satisfied that the chain guide 312 is in an appropriate position in each orientation.

However, when a rider removes the chain guide 312 from the bicycle, the rider may simply unlock the first lock 340 and remove the first bolt 340 from the chain guide assembly 302. The rider can move the chain guide assembly 302 and install it on another bicycle where a bracket has already been installed. Because the chain guide 312 is already positioned relative to at least the second orientation, the rider may find that only the first orientation needs to be set from scratch, if the configuration of the other bicycle is similar. Accordingly, the use of the second lock 768 may save a rider a great deal of adjusting time.

Figure 24:
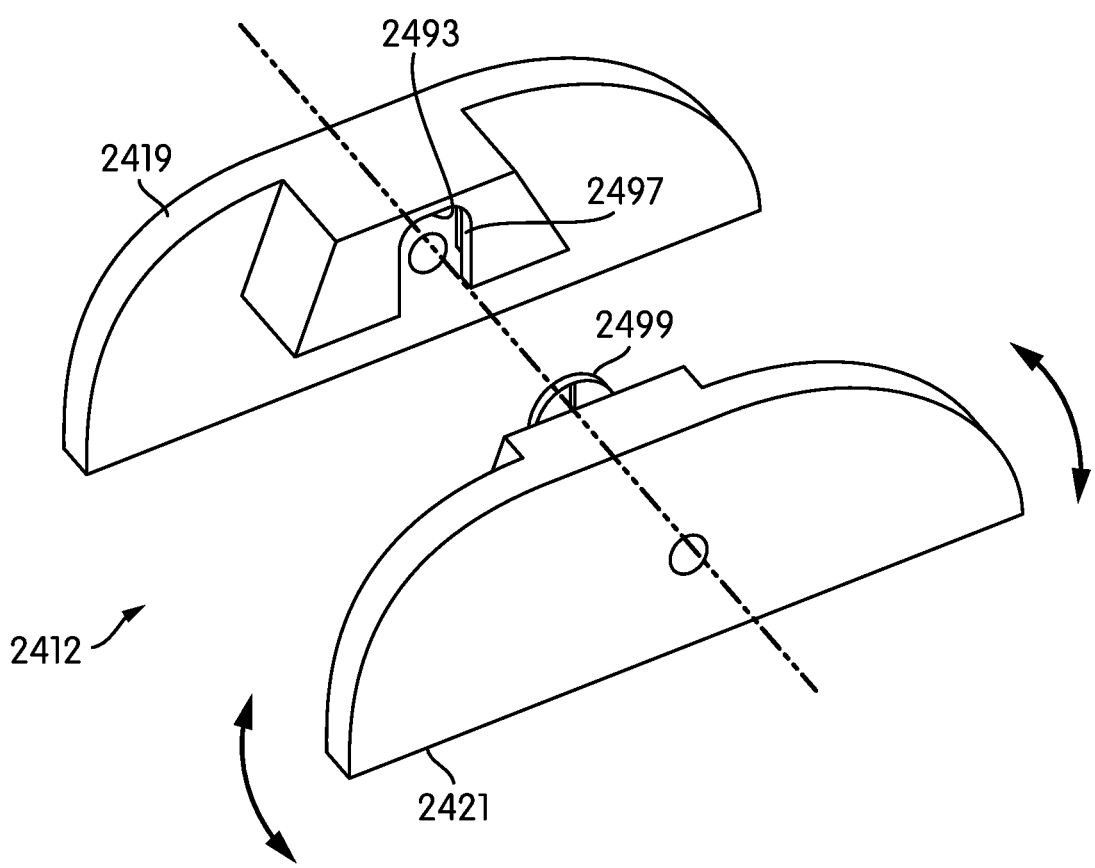
FIG. 24 is an exploded view of an alternative version of a chain guide assembly.
Figure 25:
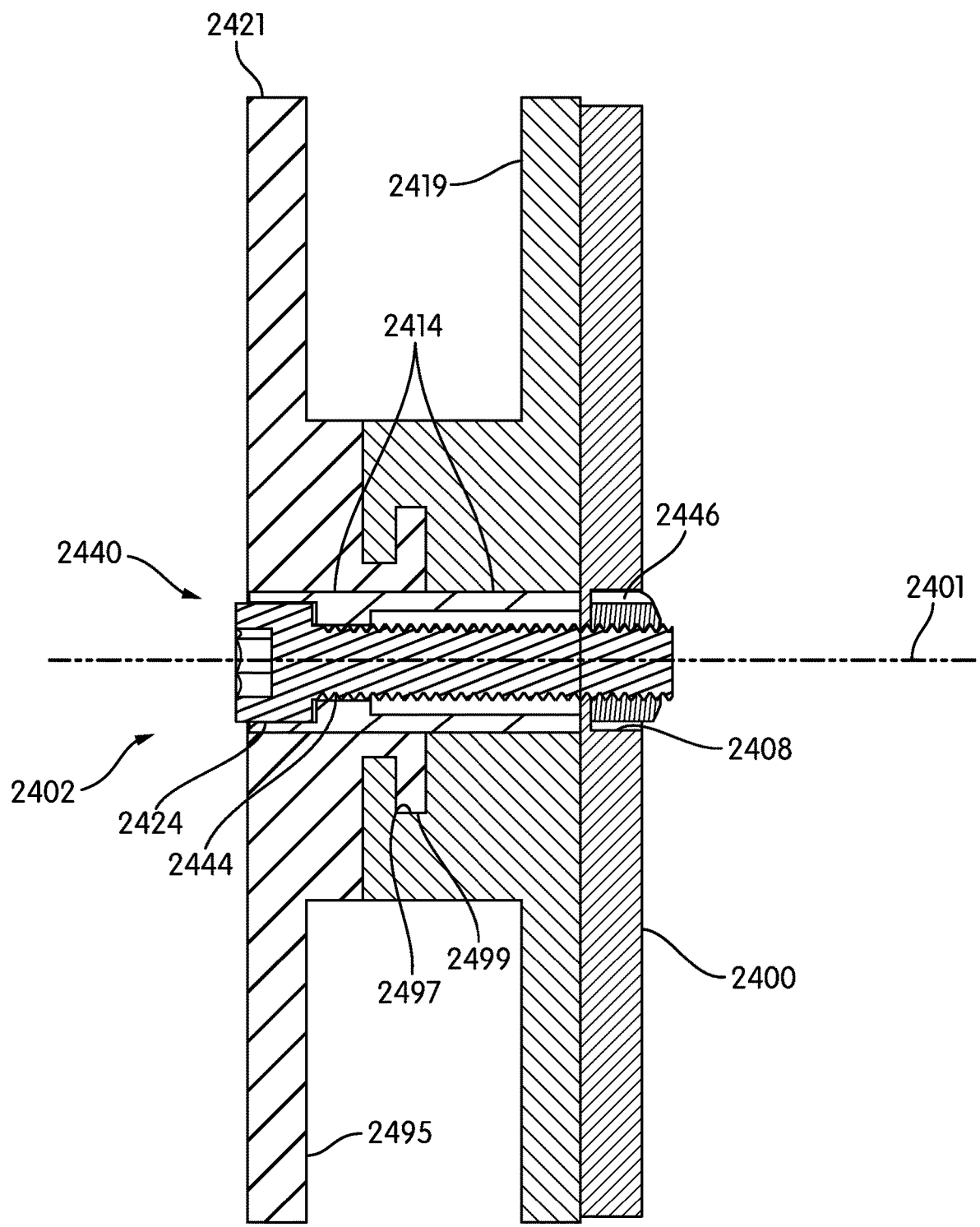
FIG. 25 is a bottom view of the chain guide assembly of FIG. 24.

Some users may prefer an embodiment that does not require the use of tools. Such an embodiment is shown in FIGS. 24 and 25. The embodiment of FIGS. 24 and 25 is shown in a somewhat simplified version. A person having ordinary skill in the art is able to easily use the structures that are described in other embodiments with the embodiment of the chain guide 2412 shown in FIGS. 24 and 25 without undue experimentation. In the embodiment of FIGS. 24 and 25, the chain guide 2412 may be formed of a first chain guide portion 2419 and a second chain guide portion 2421. As in previous embodiments, a bracket 2400 may be configured to be attached to a bicycle frame (not shown) adjacent a chain ring (not shown). The bracket 2400 may include a first slot 2408 having at least a first orientation. The chain guide assembly 2402 may include a first lock 2440. In some embodiments, the first lock 2440 may define an axis 2401 and include a first bolt 2444 that may extend at least partially through or be positioned at least partially within the first channel 2414 defined in the chain guide 2412. The first connector or bolt 2444 may define a first axis 2401. When the first bolt 2444 is inserted through the first slot 2408 in the bracket 2400, it may engage a first mating connector 2446. In some embodiments, the mating connector may be a nut, but if it is desired that the attachment of the chain guide 2412 to the bracket 2400 be entirely tool free, the mating connector 2446 may be a clip that is capable of holding the first connector 2444 in place in a first orientation along the length of the slot 2408. The first connector 2444 and the mating connector 2446 may together form the first lock 2440.

The relative movement of the first chain guide portion 2419 and the second chain guide portion 2421 may function to engage a second lock and may be configured to rotate relative to one another. In some embodiments, the second guide portion 2421 may be initially positioned so that it is offset about 90 degrees from the orientation of the first chain guide portion 2419. A projection 2499 may extend from one side 2495 of the second chain guide portion 2421. A mating slot 2497 may be formed in the first chain guide portion 2419 to receive the projection 2499. The projection 2499 and the slot 2497 may be configured to allow the first chain guide portion 2419 and the second chain guide portion 2421 to freely move relative to one another until the projection 2499 engages a stop 2493 forming an end to the slot 2497. When the projection 2499 engages the stop 2493, the second chain guide portion 2421 may be rotated relative to the first chain guide portion 2419 so that the first chain guide portion 2419 and the second chain guide portion 2421 take the shape of a chain guide like that shown in other embodiments.

The relative rotation of the first chain guide portion 2419 and the second chain guide portion 2421 may function to engage the second lock. The use of a configuration like that in FIGS. 24 and 25 may allow the user to move the chain guide 2412 in at least a second orientation, such as rotationally, and also in at least a third orientation, such as laterally, when the second lock is not engaged. In this embodiment, the second lock and engagement of the second lock may take a variety of forms. In some embodiments, the relative rotation of the chain guide portions 2419, 2421 may engage a linkage that serves to engage a second lock like that shown in one of the earlier embodiments to lock the chain guide 2412 to the sleeve 2424. In other embodiments, the relative rotation may cause the engagement of a lock internal to the first or second chain guide portion 2419, 2421 that may press against the sleeve 2424 like that shown in other embodiments. In further embodiments, the first channel 2414 may be tapered and the relative rotation of the chain guide portions 2419, 2412 may cause an interference or frictional engagement of the chain guide 2412 and the sleeve 2424.

While the details of the sleeve and guide are not shown in this embodiment, a person having ordinary skill in the art will be able to appropriately use these features to provide the independent positioning of the first and second locks. In the embodiment shown in FIGS. 24 and 25, the first and second chain guide portions may be interfitted before the placement of the chain guide 2412 onto the first connector 2444 and sleeve 2424. In an alternative embodiment, the first connector 2444 may extend only into the portion of the first channel 2414 that is defined in the first chain guide portion 2419 to allow the first chain guide portion 2419 to be locked in place by the first lock 2440 before the engagement of the second lock. In any configuration, the varieties of placement and size of the first connector that were described above may be used.

In the disclosed embodiments, structures and apertures of various sizes and shapes were illustrated. The precise configurations of these items are shown in an illustrative fashion only. A designer can easily change the shape, size, material, number or other features of these items to achieve a particular characteristic that the designer may deem particularly desirable or helpful. These modifications are well within the knowledge of a designer having ordinary skill in the art. In addition, various embodiments may have disclosed a particular modification to a primary embodiment. A design will be able to easily understand how to incorporate multiple changes to the design as disclosed and will also understand which changes cannot be incorporated in the same structure. A designer can do these substitutions without undue experimentation.

This detailed description in connection with the drawings is intended principally as a description of the presently preferred embodiments of the invention and is not intended to represent the only form in which the present invention may be constructed or utilized. The description sets forth the designs, functions, means, and methods of implementing the invention in connection with the illustrated embodiments. It is to be understood, however, that the same or equivalent functions and features may be accomplished by different embodiments that are also intended to be encompassed within the spirit and scope of the invention and that various modifications may be adopted without departing from the invention or scope of any claims.

The invention claimed is:

1. An assembly for minimizing the disengagement of a chain from a chain ring, comprising:
   a bracket configured to be attached to a bicycle frame adjacent the chain ring, the bracket defining a first slot having at least a first orientation; and
   a chain guide assembly releasably mounted to the bracket, comprising:
      a chain guide;
      a first lock defining a first axis and capable of releasably mounting the chain guide about the first axis in the first orientation in any position along a length of the first slot;
      a second lock capable of releasably mounting the chain guide in at least a second orientation about the first axis; and
      a guide configured to retain the chain guide in at least the second orientation different from the first orientation when the first lock is in an unlocked position wherein the chain guide is free to move in at least the second orientation along the first axis with respect to the bracket and the first lock, when the first lock is in a locked position.

2. The assembly for minimizing the disengagement of a chain from a chain ring according to claim 1, wherein the chain guide defines a first channel.

3. The assembly for minimizing the disengagement of a chain from a chain ring according to claim 2, further comprising a sleeve positioned at least partially within the first channel.

4. The assembly for minimizing the disengagement of a chain from a chain ring according to claim 3, wherein the bracket includes a groove and wherein the guide comprises a finger extending from a portion of the chain guide that is capable of interfitting with the groove on the bracket.

5. The assembly for minimizing the disengagement of a chain from a chain ring according to claim 3, wherein the first lock includes a first bolt positioned at least partially within the first channel.

6. The assembly for minimizing the disengagement of a chain from a chain ring according to claim 5, wherein the first lock further comprises a nut that is capable of mating with the first bolt.

7. The assembly for minimizing the disengagement of a chain from a chain ring according to claim 3, wherein the chain guide defines a second channel.

8. The assembly for minimizing the disengagement of a chain from a chain ring according to claim 7, wherein the second lock is at least partially positioned within the second channel.

9. The assembly for minimizing the disengagement of a chain from a chain ring according to claim 8, wherein a portion of the second lock is configured to engage a portion of the sleeve.

10. The assembly for minimizing the disengagement of a chain from a chain ring according to claim 1, wherein the first orientation is a substantially vertical orientation.

11. The assembly for minimizing the disengagement of a chain from a chain ring according to claim 10, wherein the second orientation is a substantially lateral orientation.

12. The assembly for minimizing the disengagement of a chain from a chain ring according to claim 10, wherein the second orientation is a substantially rotational orientation.

13. The assembly for minimizing the disengagement of a chain from a chain ring according to claim 1, wherein the chain guide is free to move in at least the second orientation and a third orientation with respect to the bracket and the first lock along the first axis when the first lock is in a locked position, and wherein the second lock is capable of releasably mounting the chain guide in the second orientation and the third orientation, and wherein the third orientation is different from the first orientation and the second orientation.

14. The assembly for minimizing the disengagement of a chain from a chain ring according to claim 13, wherein the first orientation is a substantially vertical orientation, the second orientation is a substantially lateral orientation, and the third orientation is a substantially rotational orientation.

15. The assembly for minimizing the disengagement of a chain from a chain ring according to claim 13, wherein the chain guide is free to move in a fourth orientation different from any of the first orientation, the second orientation and the third orientation.

16. The assembly for minimizing the disengagement of a chain from a chain ring according to claim 1, wherein the chain guide comprises at least a first chain guide portion and a second chain guide portion.

17. The assembly for minimizing the disengagement of a chain from a chain ring according to claim 16, wherein the first chain guide portion and the second chain guide portion are configured to rotate relative to one another.

18. The assembly for minimizing the disengagement of a chain from a chain ring according to claim 17, wherein rotation of the first chain guide portion and second chain guide portion relative to one another engages the second lock.

19. An assembly for minimizing the disengagement of a chain from a chain ring, comprising:
   a bracket configured to be attached to a bicycle frame adjacent the chain ring, the bracket defining a first slot having at least a first orientation; and
   a chain guide assembly releasably mounted to the bracket, comprising:
      a chain guide;
      a first lock defining a first axis and capable of releasably mounting the chain guide in any position along a length of the first slot;
      a second lock capable of releasably mounting the chain guide in at least a second orientation; and
      a guide configured to retain the chain guide in at least the second orientation different from the first orientation when the first lock is in an unlocked position;
         wherein the chain guide is free to move in at least the second orientation along the first axis with respect to the bracket and the first lock, when the first lock is in a locked position; and
         wherein the sleeve has a first diameter, the first bolt has a head having a second diameter, and the second diameter is greater than the first diameter.

20. The assembly for minimizing the disengagement of a chain from a chain ring according to claim 19, wherein the first channel has a third diameter and the second diameter is greater than the third diameter.

* * * * *